(12) United States Patent
Kim et al.

(10) Patent No.: US 10,310,308 B2
(45) Date of Patent: Jun. 4, 2019

(54) CURVED TRANSPARENT SUBSTRATE INCLUDING AN ALKALI-FREE SUBSTRATE, CURVED DISPLAY PANEL INCLUDING THE SAME AND METHOD OF MANUFACTURING THE SAME

(71) Applicant: Samsung Display Co., Ltd., Yongin-Si, Gyeonggi-Do (KR)

(72) Inventors: Seung Kim, Seongnam-si (KR); Seung-Ho Kim, Asan-si (KR); Cheol-Min Park, Hwaseong-si (KR); Sang-Hoon Ahn, Seoul (KR); Eun-Kyung Yeon, Suwon-si (KR); Hoi-Kwan Lee, Anseong-si (KR); In-Sun Hwang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 149 days.

(21) Appl. No.: 15/158,884

(22) Filed: May 19, 2016

(65) Prior Publication Data
US 2016/0342010 A1  Nov. 24, 2016

(30) Foreign Application Priority Data

May 19, 2015  (KR) .................. 10-2015-0070008

(51) Int. Cl.
   *G02F 1/1333*  (2006.01)
(52) U.S. Cl.
   CPC .............................. *G02F 1/133305* (2013.01)

(58) Field of Classification Search
   CPC ...... A01N 59/16; A01N 25/08; C03C 21/002; C03C 21/005; C03C 10/0045; C03C 13/046; C03C 23/0055; C03C 3/091
   See application file for complete search history.

(56) References Cited

U.S. PATENT DOCUMENTS

| | | | | |
|---|---|---|---|---|
| 3,790,430 A | * | 2/1974 | Mochel | .................. C03C 3/091 351/159.57 |
| 4,217,240 A | * | 8/1980 | Bergna | ..................... B01J 13/02 208/120.01 |
| 6,134,918 A | * | 10/2000 | Eto | ........................ C03C 21/002 65/30.14 |
| 8,776,547 B2 | | 7/2014 | Abramov et al. | |
| 2005/0162956 A1 | * | 7/2005 | Ikenishi | .................. C03C 3/085 365/222 |
| 2013/0224491 A1 | * | 8/2013 | Smedskjaer | ............ C03C 3/085 428/410 |
| 2014/0120335 A1 | * | 5/2014 | Yamanaka | .............. C03C 3/087 428/220 |

(Continued)

FOREIGN PATENT DOCUMENTS

| | | |
|---|---|---|
| KR | 1020070032914 A | 3/2007 |
| KR | 1020080031729 A | 4/2008 |

(Continued)

*Primary Examiner* — Huyen L Ngo
(74) *Attorney, Agent, or Firm* — Cantor Colburn LLP

(57) ABSTRACT

A curved transparent substrate includes an alkali-free base layer having a curved shape and a compression applying layer compression applying layer which is disposed on a surface of the alkali-free base layer and applies a compression to the alkali-free base layer where an alkali ion content of the compression applying layer is greater than an alkali ion content of the alkali-free base layer.

13 Claims, 16 Drawing Sheets

(56) References Cited

U.S. PATENT DOCUMENTS

2015/0210590 A1\* 7/2015 Chang .................. C03C 21/002
                                                                          428/220
2017/0036954 A1\* 2/2017 Kuksenkova .......... C03C 3/091

FOREIGN PATENT DOCUMENTS

| KR | 101022591 B1 | 3/2011 |
| KR | 1020120065038 A | 6/2012 |
| KR | 101399400 B1 | 5/2014 |

\* cited by examiner

CURVED TRANSPARENT SUBSTRATE INCLUDING AN ALKALI-FREE SUBSTRATE, CURVED DISPLAY PANEL INCLUDING THE SAME AND METHOD OF MANUFACTURING THE SAME

This application claims priority to Korean Patent Application No. 10-2015-0070008, filed on May 19, 2015 and all the benefits accruing therefrom under 35 U.S.C. § 119, the content of which in their entirety is herein incorporated by reference.

BACKGROUND

1. Field

Exemplary embodiments relate generally to a curved transparent substrate. More particularly, exemplary embodiments relate to the curved transparent substrate including an alkali-free substrate, a curved display panel including the curved transparent substrate and methods of manufacturing the curved display panel.

2. Description of the Related Art

A liquid crystal display ("LCD") apparatus is one of a flat panel display ("FPD"), which is broadly used recently. The LCD apparatus applies voltages to molecules of liquid crystal to adjust arrangements of the molecules thereby changing optical characteristics of a liquid crystal cell such as birefringence, optical activity, dichroism and light scattering to display an image. The LCD apparatus generally includes a liquid crystal display panel, a driving unit and a backlight assembly.

However, in the LCD apparatus, because a distance between an observer's eye and a central region of the display panel and a distance between the observer's eye and an edge region of the display panel are different from each other, the observer may feel the difference between the distances. To solve the problem, the LCD apparatus may have a curved shape.

Particularly, a process of bending a flat display panel is performed such that the LCD apparatus has the curved shape, and tension is generated in a glass substrate of a curved display panel. A plurality of micro flaws in the glass substrate develop as a result of the tension and thus durability of the curved display panel having the glass substrate decreases.

SUMMARY

Accordingly, the invention is provided to substantially obviate one or more problems due to limitations and disadvantages of the related art.

Exemplary embodiments provide a curved transparent substrate having a high durability.

Exemplary embodiments provide a curved display panel having the curved transparent substrate.

Exemplary embodiments provide a method of manufacturing the curved display panel.

According to exemplary embodiments, a curved transparent substrate includes an alkali-free base layer and a compression applying layer. The alkali-free base layer has a curved shape. The compression applying layer is disposed on a surface of the alkali-free base layer to apply a compression to the alkali-free base layer. An alkali ion content of the compression applying layer is greater than an alkali ion content of the alkali-free base layer.

In exemplary embodiments, a nonbridging oxygen content of the compression applying layer may be greater than a nonbridging oxygen content of the alkali-free base layer.

In exemplary embodiments, the compression applying layer may include a plurality of first alkali ions and a plurality of second alkali ions. A size of each of the first alkali ions may be different from a size of each of the second alkali ions.

In exemplary embodiments, the alkali-free base layer may have a first surface which is convex and a second surface which is concave. The compression applying layer may be disposed on the first surface of the alkali-free base layer.

In exemplary embodiments, the compression applying layer may be further disposed on a side surface of the alkali-free base layer connecting the first surface and the second surface of the alkali-free base layer.

In exemplary embodiments, the alkali-free base layer may have a curve shape along a first direction. The compression applying layer may be disposed on a portion of the first surface of the alkali-free base layer. The compression applying layer may be elongated along a second direction crossing the first direction over a central portion of the alkali-free base layer.

In exemplary embodiments, the compression applying layer may be recessed from the first surface of the alkali-free base layer.

In exemplary embodiments, the compression applying layer may include aluminosilicate. A ratio of alkali metal oxide to aluminum oxide of the compression applying layer may be within a range of about 0.5 to about 1.5.

In exemplary embodiments, a coefficient of thermal expansion of the compression applying layer may be substantially the same as a coefficient of thermal expansion of the alkali-free base layer.

According to exemplary embodiments, a curved display panel includes a first substrate, a second substrate and a liquid crystal layer. The first substrate includes a curved transparent substrate, a switching element arranged at the curved transparent substrate and a pixel electrode connected to the switching element. The second substrate is opposite to the first substrate. The liquid crystal layer is disposed between the first and second substrates. The curved transparent substrate includes an alkali-free base layer having a curved shape and a compression applying layer disposed on a surface of the alkali-free base layer to apply a compression to the alkali-free base layer. An alkali ion content of the compression applying layer is greater than an alkali ion content of the alkali-free base layer.

In exemplary embodiments, a nonbridging oxygen content of the compression applying layer may be greater than a nonbridging oxygen content of the alkali-free base layer.

In exemplary embodiments, the compression applying layer may include a plurality of first alkali ions and a plurality of second alkali ions. A size of each of the first alkali ions may be different from a size of each of the second alkali ions.

In exemplary embodiments, the alkali-free base layer may have a first surface which is convex and a second surface which is concave. The compression applying layer may be disposed on the first surface of the alkali-free base layer.

In exemplary embodiments, the compression applying layer may include aluminosilicate. A ratio of alkali metal oxide to aluminum oxide of the compression applying layer may be within a range of about 0.5 to about 1.5.

In exemplary embodiments, a coefficient of thermal expansion of the compression applying layer may be substantially the same as a coefficient of thermal expansion of the alkali-free base layer.

According to exemplary embodiments, in a method of manufacturing a curved display panel, a display panel including a first substrate, a second substrate and a liquid crystal layer is provided. The first substrate includes an alkali-free substrate, a switching element arranged at the alkali-free substrate and a pixel electrode connected to the switching element. The second substrate is opposite to the first substrate. The liquid crystal layer is disposed between the first and second substrates. The alkali-free substrate is bent such that the display panel has a curved shape. An alkali-free base substrate having a curved shape and a compression applying layer is disposed on a surface of the alkali-free base substrate at the alkali-free substrate. An alkali ion content of the compression applying layer is greater than an alkali ion content of the alkali-free base layer.

In forming the compression applying layer, an alkali layer including a plurality of first alkali ions may be provided at the alkali-free substrate. A portion of the first alkali ions may be replaced with a plurality of second alkali ions to transform the alkali layer into the compression applying layer.

In forming the alkali layer including the first alkali ions, a paste including the first alkali ions may be spread on the alkali-free substrate. The alkali-free substrate spread with the paste may be heated.

In forming the alkali layer including the first alkali ions, a frit including the first alkali ions may be stacked on the alkali-free substrate. The frit may be heated and exsiccated.

In replacing the portion of the first alkali ions with the second alkali ions, the portion of the first alkali ions may be replaced with the second alkali ions by a dry ion exchange process.

Accordingly, because the curved display panel in accordance with exemplary embodiments includes the alkali-free base layer, it is prevented that alkali ions are diffused into a substrate and a display panel is deteriorated.

In addition, by a bending process to have a curved shape, a tension is applied to the alkali-free base layer, and a plurality of micro flaws included in the alkali-free base layer may develop. However, by the curved display panel in accordance with exemplary embodiments, the compression applying layer apply a compression to the alkali-free base layer and the compression applying layer may prevent the micro flaws from developing.

The compression applying layer includes the nonbridging oxygen and the alkali ion combined with nonbridging oxygen by an ionic bond such that a conventional glass reinforcement process can be performed, and the tension is applied to the alkali-free base layer adjacent to the compression applying layer, and the curved display panel may have a high durability.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION

Figure 1:
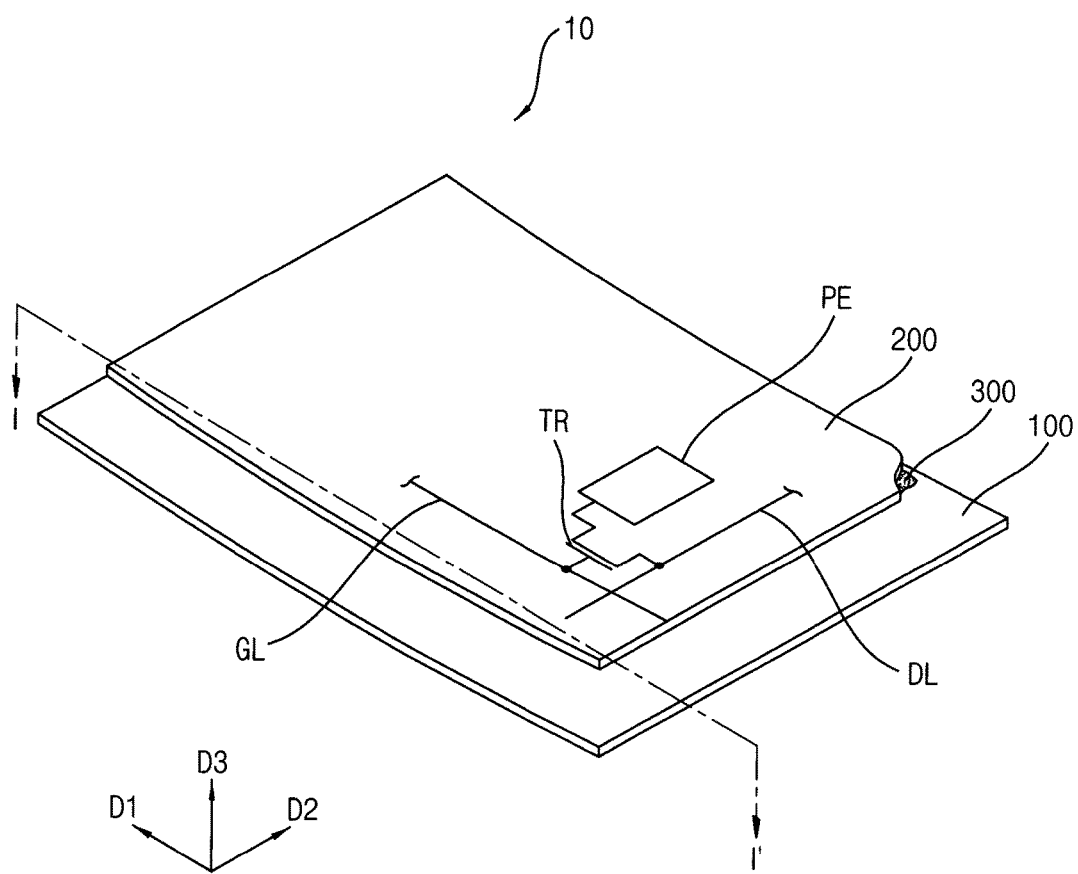
FIG. 1 is a perspective view illustrating exemplary embodiments of a curved display panel according to the invention.

Various exemplary embodiments will be described more fully with reference to the accompanying drawings, in which embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
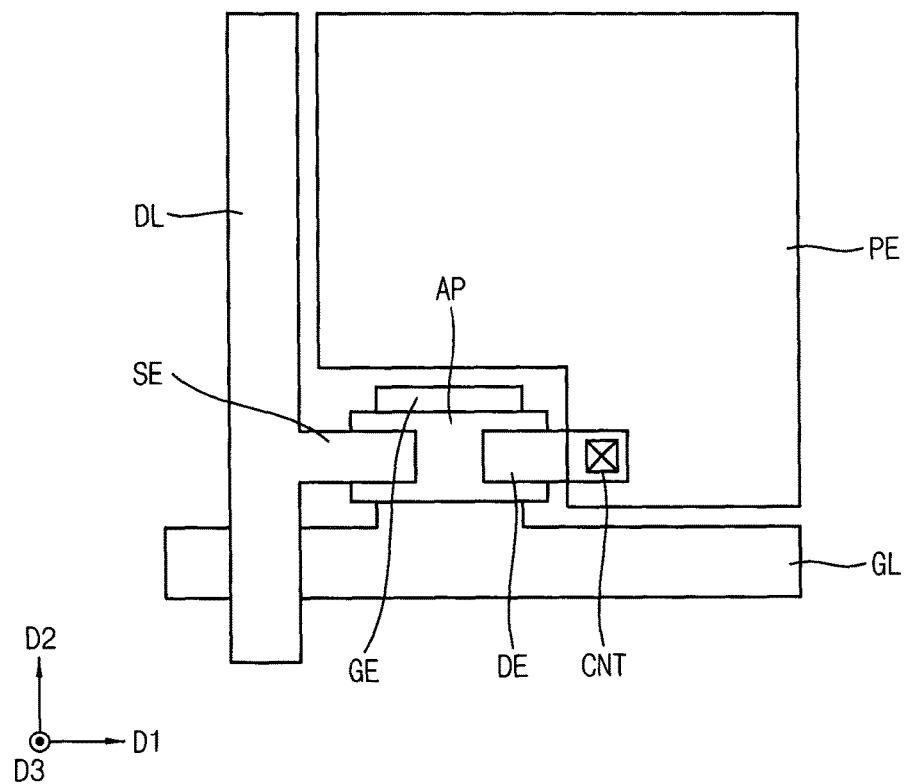
FIG. 2 is a partially enlarged plan view illustrating the curved display panel of FIG. 1.
Figure 3:
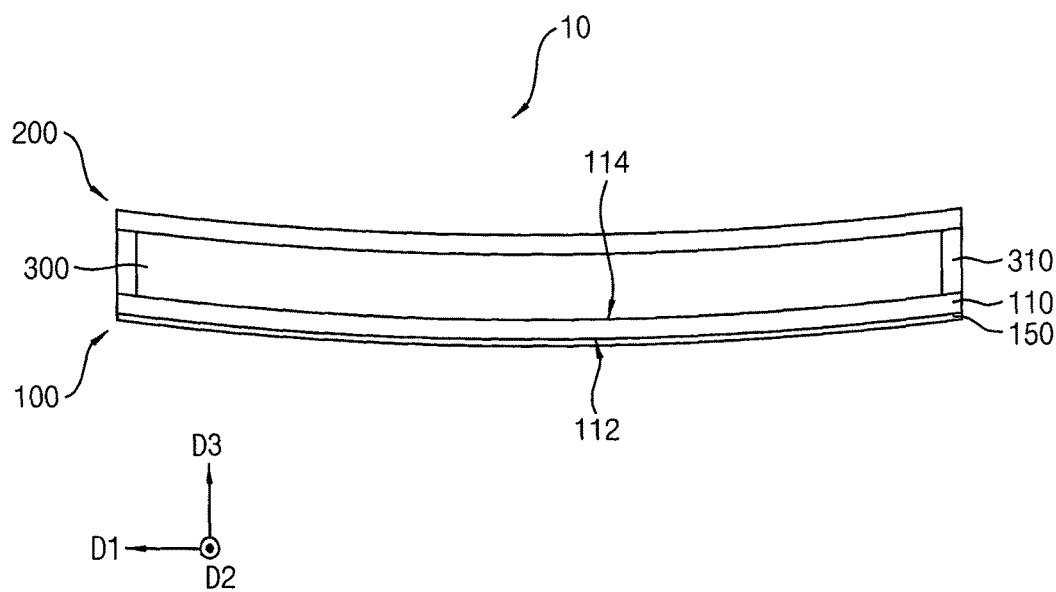
FIG. 3 is a cross-sectional view cut along the line I-I' of FIG. 1.
Figure 4:
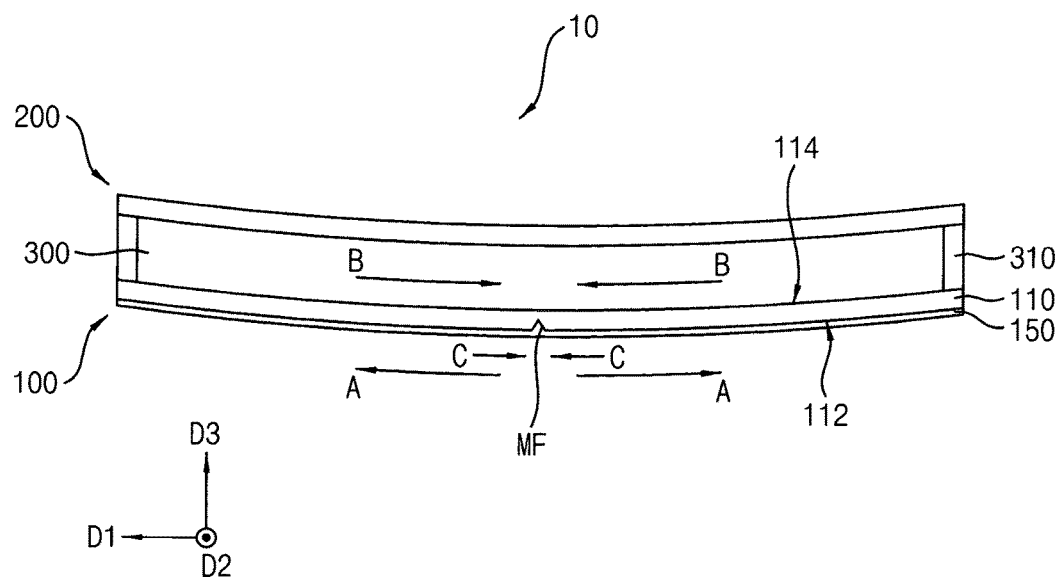
FIGS. 4 to 6 are cross-sectional views for explaining a tension and a compression applied to exemplary embodiments of the curved display panel according to the invention.
Figure 5:
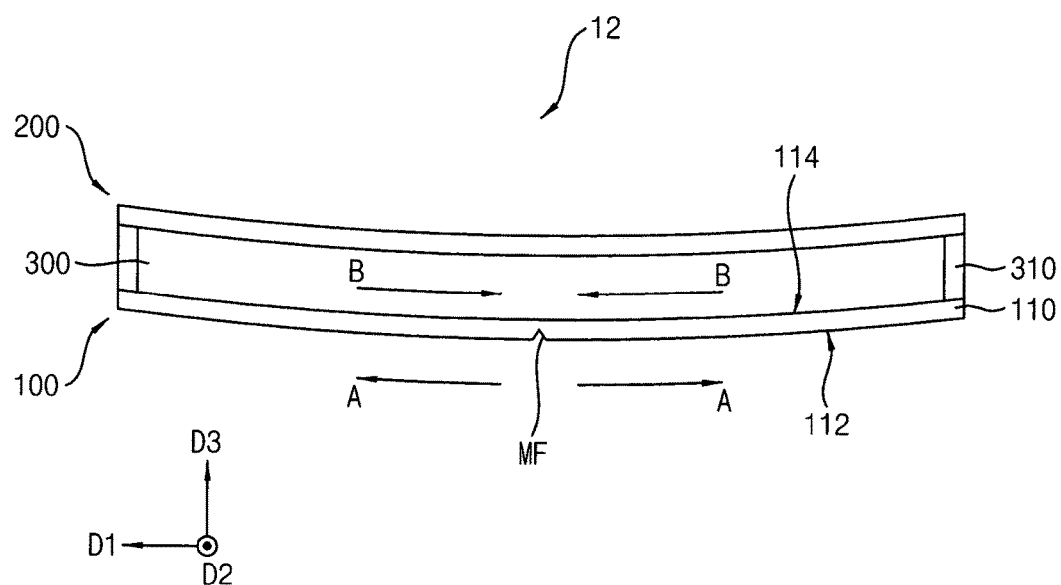
Figure 6:
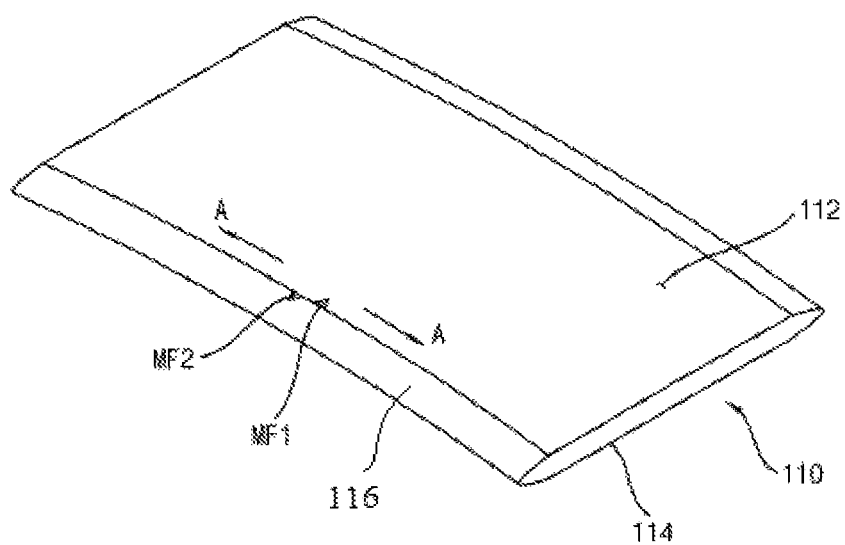

FIG. 1 is a perspective view illustrating a curved display panel according to exemplary embodiments. FIG. 2 is a partially enlarged plan view illustrating the curved display panel of FIG. 1. FIG. 3 is a cross-sectional view cut along the line I-I' of FIG. 1. FIGS. 4 to 6 are cross-sectional views for explaining a tension and a compression applied to the curved display panel according to exemplary embodiments.

Referring to FIGS. 1 to 6, a curved display panel 10 includes a first substrate 100, a second substrate 200 opposite to the first substrate 100 and a liquid crystal layer 300 disposed between the first substrate 100 and the second substrate 200. The curved display panel 10 may be electrically connected to a driving part (not shown) and an electric signal may be applied from the driving part to the curved display panel 10.

The curved display panel 10 may include a plurality of gate lines GL, a plurality of data lines DL, a plurality of switching elements TR and a plurality of pixels PE. In an exemplary embodiment, the plurality of switching elements TR may be a thin film transistor ("TFT"). The gate lines GL may extend in a first direction D1 and the gate lines GL may be arranged along a second direction D2 crossing (e.g., substantially perpendicular to) the first direction D1. The data lines DL may extend in the second direction D2 and the data lines DL may be arranged along the first direction D1.

The switching elements TR may be electrically connected to the gate lines GL and the data lines DL respectively. The pixel electrodes PE may be electrically connected to the switching elements TR respectively. Each of the switching elements TR may include a gate electrode GE, a source electrode SE and a drain electrode DE.

The second substrate 200 may be opposite to the first substrate 100, and the second substrate 200 may be arranged along a third direction D3 crossing (e.g., substantially perpendicular to) the first and second directions D1 and D2.

The second substrate 200 may include a color filter (not shown). In an alternative exemplary embodiment, the color filter may be disposed on the first substrate 100. In addition, the second substrate 200 may include a pixel common electrode (not shown) to form a vertical electric field between the pixel common electrode and the pixel electrode PE arranged on the first substrate 100. In an alternative exemplary embodiment, the pixel common electrode may be disposed on the first substrate 100 to form a horizontal electric field between the pixel common electrode and the pixel electrode PE. In an exemplary embodiment, a slit pattern may be defined in the pixel electrode PE or the pixel common electrode.

The liquid crystal layer 300 may be disposed between the first and second substrates 100 and 200. Arrangement of molecules included in the liquid crystal layer 300 may be changed by the vertical or horizontal electric field such that a light generated by a back light unit (not shown) may be transmitted or may not be transmitted through the liquid crystal layer 300.

A sealing member 310 may connect the first substrate 100 and the second substrate 200. The liquid crystal layer 300 may be sealed by the first and second substrate 100 and 200 and the sealing member 310.

As illustrated in FIGS. 2 and 3, the first substrate 100 may include an alkali-free base layer 110 having a curved shape and a compression applying layer 150 disposed on a surface 112 of the alkali-free base layer 110.

In an exemplary embodiment, the alkali-free base layer 110 may be an alkali-free glass substrate. In an exemplary embodiment, the alkali-free base layer 110 may not include alkali metal oxide $R_2O$ or may include very little amount of alkali metal oxide $R_2O$, for example.

In an exemplary embodiment, the alkali metal oxide may be $Li_2O$, $Na_2O$, or $K_2O$, for example. In an exemplary embodiment, the alkali-free base layer 110 may include less than about 0.2% by weight of the alkali metal oxide based on a total weight of the alkali-free base layer 110, for example. In an exemplary embodiment, the alkali metal oxide may include $B_2O_3$, and $B_2O_3$ may serve as a flux.

An alkali ion content of the compression applying layer 150 may be greater than an alkali ion content of the alkali-free base layer 110. In an exemplary embodiment, an amount of alkali ions of the compression applying layer 150 may be greater than an amount of alkali ions of the alkali-free base layer 110, for example.

The compression applying layer 150 may be stacked on the surface 112 of the alkali-free base layer 110. The gate electrode GE, the gate line GL, an active pattern AP, the source electrode SE, the drain electrode DE, the data line DL and the pixel electrode PE may be disposed on the other surface 114 of the alkali-free base layer 110.

The gate electrode GE may be electrically and physically connected to the gate line GL. A gate signal from a gate driving part (not shown) may be applied to the gate electrode GE. In an exemplary embodiment, the gate electrode GE may include aluminum (Al), titanium (Ti), copper (Cu), molybdenum (Mo), tantalum (Ta), tungsten (W), neodymium (Nd), chrome (Cr), silver (Ag), copper oxide (CuOx) and etc., for example. In an exemplary embodiment, the gate electrode GE may include gallium doped zinc oxide (GZO), indium doped zinc oxide (IZO), copper-manganese (CuMn) and etc., for example.

The active pattern AP may be insulated by a gate insulation layer and the active pattern AP may be disposed on the gate electrode GE. At least a portion of the active pattern AP may overlap the gate electrode GE. In an exemplary embodiment, the active pattern AP may include indium (In), zinc (Zn), gallium (Ga), tin (Sn), hafnium (Hf) and the like. In an exemplary embodiment, the active pattern 113 may be an oxide semiconductor pattern including indium gallium zinc oxide ("IGZO"), indium tin zinc oxide ('ITZO"), hafnium indium zinc oxide ("HIZO") and etc., for example.

The source electrode SE is disposed on the gate insulation layer to overlap a first end of the active pattern AP. The source electrode SE may be electrically connected to the data line DL. A data voltage may be applied to the source electrode SE from the data driving part (not shown).

The drain electrode DE is spaced apart form source electrode SE. The drain electrode DE is disposed on the gate insulation layer to overlap a second end of the active pattern AP.

In an exemplary embodiment, the source electrode SE and the drain electrode DE may include aluminum (Al), titanium (Ti), copper (Cu), molybdenum (Mo), tantalum (Ta), tungsten|(W), neodymium (Nd), Chrome (Cr), Silver (Ag) and etc., for example.

The pixel electrode PE is electrically connected to the drain electrode DE through a contact hole CNT. The pixel electrode PE may include a transparent conductive material. In an exemplary embodiment, the pixel electrode PE may include indium zinc oxide ("IZO"), indium tin oxide ("ITO"), tin oxide (SnOx), zinc oxide (ZnOx) and etc., for example.

The compression applying layer 150 may be disposed on the surface 112 of the alkali-free base layer 110 to apply a compression to the alkali-free base layer 110 such that the compression prevents a plurality of micro flaws MF in FIG. 4 from developing.

In exemplary embodiments, the compression applying layer 150 may include nonbridging oxygen, for example. In a glass oxide structure, the nonbridging oxygen may be combined with a positive ion by a covalent bond and another positive ion by an ionic bond.

In an exemplary embodiment, the nonbridging oxygen may be combined with a silicon ion by a covalent bond and also the nonbridging oxygen may be combined with an alkali ion by an ionic bond.

In addition, the compression applying layer 150 may include a plurality of nonbridging oxygens, a plurality of first alkali ions and a plurality of second alkali ions which are combined with the nonbridging oxygens by an ionic bond, respectively. A size of each of the first alkali ions may be different from a size of each of the second alkali ions.

In an exemplary embodiment, the compression applying layer 150 may primarily include Li ions, and a portion of the Li ions may be replaced with Na ions. Accordingly, the compression applying layer 150 may include Li ions and Na ions.

In an alternative exemplary embodiment, the compression applying layer 150 may primarily include Na ions, and a portion of the Na ions may be replaced with K ions. Accordingly, the compression applying layer 150 may include Na ions and K ions.

By replacing a portion of the first alkali ions of which the size is smaller than the size of the second alkali ions with the second alkali ions, the compression applying layer 150 may apply the compression to the alkali-free base layer 110.

In an exemplary embodiment, the compression applying layer 150 may include aluminosilicate, for example. In an exemplary embodiment, a ratio of alkali metal oxide $R_2O$ to aluminum oxide $Al_2O_3$ of the compression applying layer may be within a range of about 0.5 to about 1.5, for example.

In an exemplary embodiment, when the ratio is less than about 0.5, for example, acid resistance may decrease and the compression applying layer 150 may become blurred. When the ratio is greater than about 1.5, glass crystallization may occur such that transmittance of the compression applying layer 150 decreases.

In addition, a coefficient of thermal expansion of the compression applying layer 150 may be substantially the same as a coefficient of thermal expansion of the alkali-free base layer 110. When the alkali-free base layer 110 and the compression applying layer 150 are heated, thermal stress of the alkali-free base layer 110 caused by the heat may be reduced.

In an exemplary embodiment, the coefficient of thermal expansion of the compression applying layer 150 may be within a rage of about $30 \times 10^{-7} \circ C.^{-1}$ to about $40 \times 10^{-7} \circ C.^{-1}$, for example.

As illustrated in FIG. 4, when the curved display panel is manufactured by bending a flat display panel, a tension A may be applied to the surface 112 of the alkali-free base layer 110 and a compression B may be applied to the other surface 114 of the alkali-free base layer 110.

The micro flaws MF included in the alkali-free base layer 110 may develop by the tension A applied to the surface 112 of the compression applying layer 150 such that a durability of the curved display panel 10 decreases.

The curved display panel 10 in accordance with exemplary embodiments may include the compression applying layer 150 disposed on the surface 112 of the alkali-free base layer 110, thereby applying the compression C to the surface 112 of the alkali-free base layer 110 to prevent the micro flaws MF from developing.

In an exemplary embodiment, a radius of curvature of the surface 112 of the alkali-free base layer 110 is greater than a radius of curvature of the other surface 114 of the alkali-free base layer 110, for example. The compression applying layer 150 may be disposed on the surface 112 of the alkali-free base layer 110.

As illustrated in FIG. 5, when a curved display panel 12 without the compression applying layer 150 is manufactured by bending a flat display panel, a tension A may be applied to the surface 112 of the alkali-free base layer 110 and a compression B may be applied to the other surface 114 of the alkali-free base layer 110.

Because there is no element to prevent the micro flaws MF from developing in the curved display panel 12, the micro flaws MF may develop by the tension A and the durability of the curved display panel 12 may decrease, and even the curved display panel 12 may be cracked.

As illustrated in FIG. 6, the alkali base layer 110 may include a plurality of micro flaws MF1 and MF2. A first micro flaw MF1 may be generated in the surface 112 of the alkali-free layer 110, and a second micro flaw MF2 may be also generated in a side surface 116 connecting the surfaces 112 and 114.

When the alkali-free base layer 112 is grinded or polished by a mechanical process, the micro flaws MF1 and MF2 may be generated and the micro flaws MF1 and MF2 may gradually develop by the tension A.

Accordingly, because the curved display panel 10 in accordance with exemplary embodiments includes the alkali-free base layer 110, it may be prevented that alkali ions are diffused into a substrate and the curved display panel 10 is deteriorated.

In addition, by a bending process to have a curved shape, the tension A is applied to the alkali-free base layer 110, and a plurality of micro flaws MF included in the alkali-free base layer 110 may develop. However, by the curved display panel 10 in accordance with exemplary embodiments, the compression applying layer 150 applies the compression C to the alkali-free base layer 110 and the compression applying layer 150 may prevent the micro flaws MF from developing.

The compression applying layer 150 includes the nonbridging oxygen and the alkali ion combined with nonbridging oxygen by an ionic bond such that a conventional glass reinforcement process can be performed, and the tension C is applied to the alkali-free base layer 110 adjacent to the compression applying layer 150, thereby the curved display panel 10 may have a high durability.

Hereinafter, a method of manufacturing the curved display panel 10 will be explained in detail.

FIGS. 7 to 11 are cross-sectional views illustrating steps of a method of manufacturing a curved display panel according to exemplary embodiments.

Figure 7:
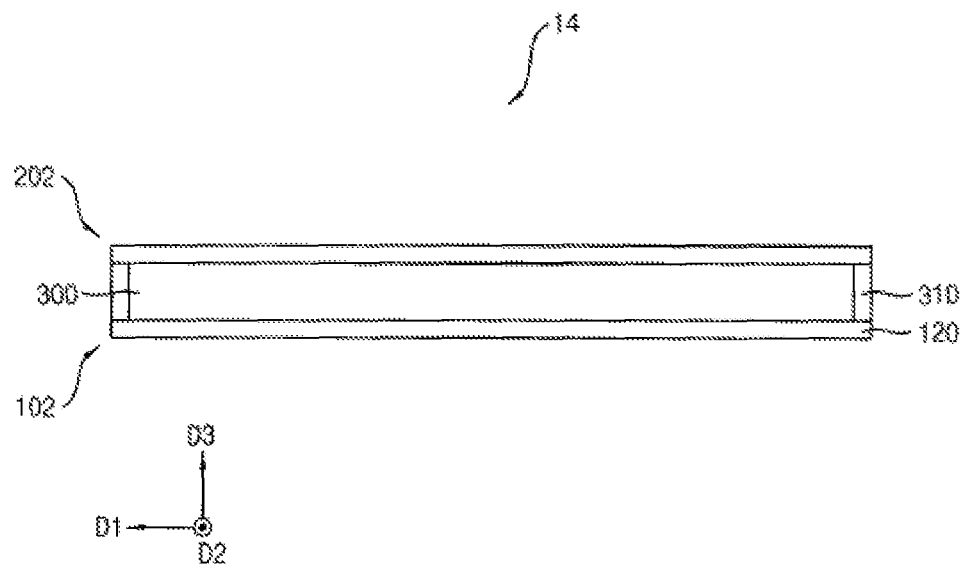
FIGS. 7 to 11 are cross-sectional views illustrating exemplary embodiments of steps of a method of manufacturing a curved display panel according to the invention.

Referring to FIGS. 2 and 7, a flat display panel 14 may be provided. The flat display 14 may include a first flat substrate 102, a second flat substrate 202 opposite to the first flat substrate 102 and a liquid crystal layer 300 disposed between the first and second flat substrates 102 and 202. The first flat substrate 102 may include an alkali-free flat substrate 120, a switching element on the alkali-free flat substrate 120 and a pixel electrode connected to the switching element.

The first flat substrate 102 may include a plurality of gate lines GL, a plurality of data lines DL, a plurality of switching elements TR and a plurality of pixels PE. The gate lines GL may extend in a first direction D1 and the gate lines GL may be arranged along a second direction D2 crossing the first direction D1. The data lines DL may extend in the second direction D2 and the data lines DL may be arranged along the first direction D1.

The switching elements TR may be electrically connected to the gate lines GL and the data lines DL respectively. The pixel electrodes PE may be electrically connected to the switching elements TR respectively.

The second flat substrate 202 may be opposite to the first flat substrate 102, and the second flat substrate 202 may be arranged along a third direction D3 crossing the first and second directions D1 and D2.

The second flat substrate 202 may include a color filter (not shown). In an alternative exemplary embodiment, the color filter may be disposed on the first flat substrate 102. In addition, the second flat substrate 202 may include a pixel common electrode (not shown) to form a vertical electric field between the pixel common electrode and the pixel electrode PE arranged on the first flat substrate 102. In an alternative exemplary embodiment, the pixel common electrode may be disposed on the first flat substrate 102 to form a horizontal electric field between the pixel common electrode and the pixel electrode PE. In an exemplary embodiment, a slit pattern may be defined in the pixel electrode PE or the pixel common electrode.

The liquid crystal layer 300 may be disposed between the first and second flat substrates 102 and 202. Arrangement of molecules included in the liquid crystal layer 300 may be changed by the vertical or horizontal electric field such that a light generated by a back light unit (not shown) may be transmitted or not be transmitted through the liquid crystal layer 300.

A sealing member 310 may connect the first flat substrate 102 and the second flat substrate 202. The liquid crystal layer 300 may be sealed by the first and second flat substrates 102 and 202 and the sealing member 310.

Figure 8:
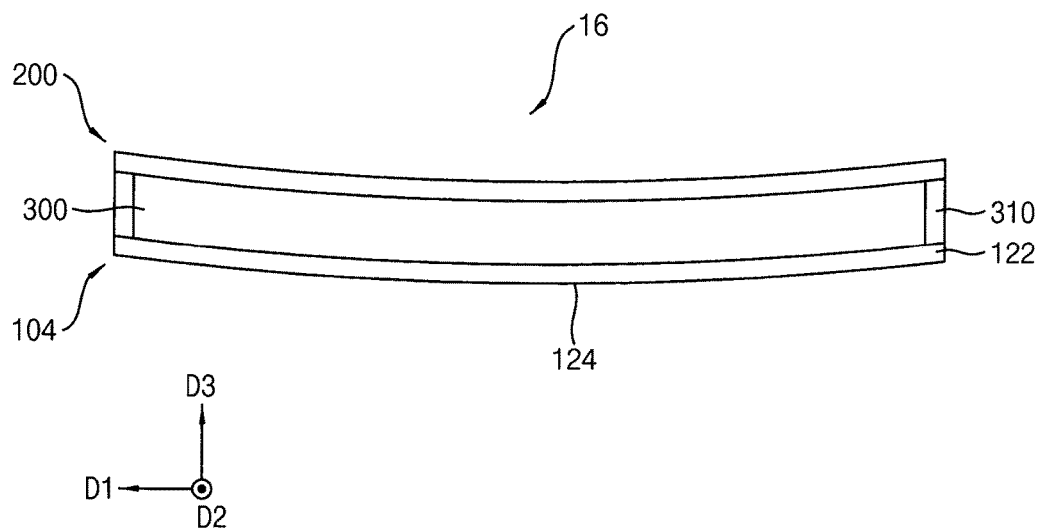

Referring to FIG. 8, a curved preliminary display panel 16 having a curved shape may be provided by bending the flat display panel 14.

In an exemplary embodiment, by applying a force to both ends of the flat display panel 14, the flat display panel 14 may be bent mechanically, for example.

By a bending process of the flat display panel 14, the alkali-free flat substrate 120 may be transformed into a curved alkali-free substrate 122. In addition, the first and second flat substrates 102 and 202 may be transformed into first and second curved substrates 104 and 200, respectively.

Figure 9:
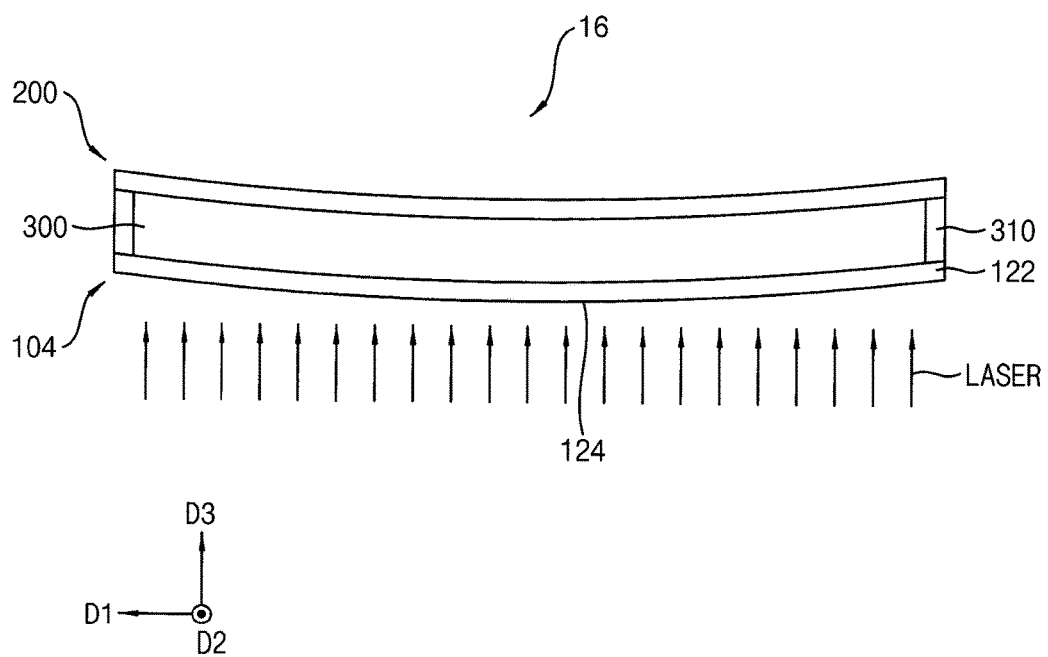

Referring to FIG. 9, a paste including a plurality of first alkali ions may be spread on a surface 124 of the curved alkali-free substrate 122, and the surface 124 of the curved alkali-free substrate 122 spread with the paste may be heated.

In an exemplary embodiment, the paste may include the first alkali metal ions, for example. In an exemplary embodiment, the first alkali metal ions may be Li ions, Na ions, K ions, Rb ions, or Cs ions, for example.

By using a laser source, a laser may be incident on the surface 124 of the curved alkali-free substrate 122 to heat the surface 124 of the curved alkali-free substrate 122.

When the surface 124 of the curved alkali-free substrate 122 is spread with the paste and heated by the laser source, a bridging oxygen included in the curved alkali-free substrate 122 may be transformed into a nonbridging oxygen.

Figure 10:
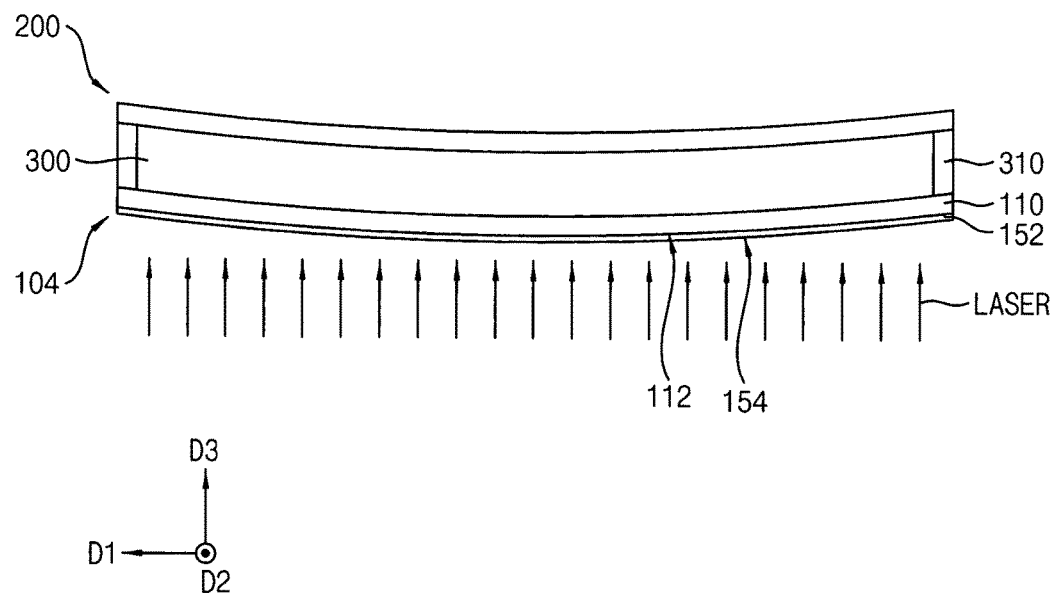

In addition, the curved alkali-free substrate 122 may be transformed into an alkali-free base layer 110 in FIG. 10 and a preliminary layer 152 in FIG. 10 disposed on the alkali-free base layer 110.

Figure 11:
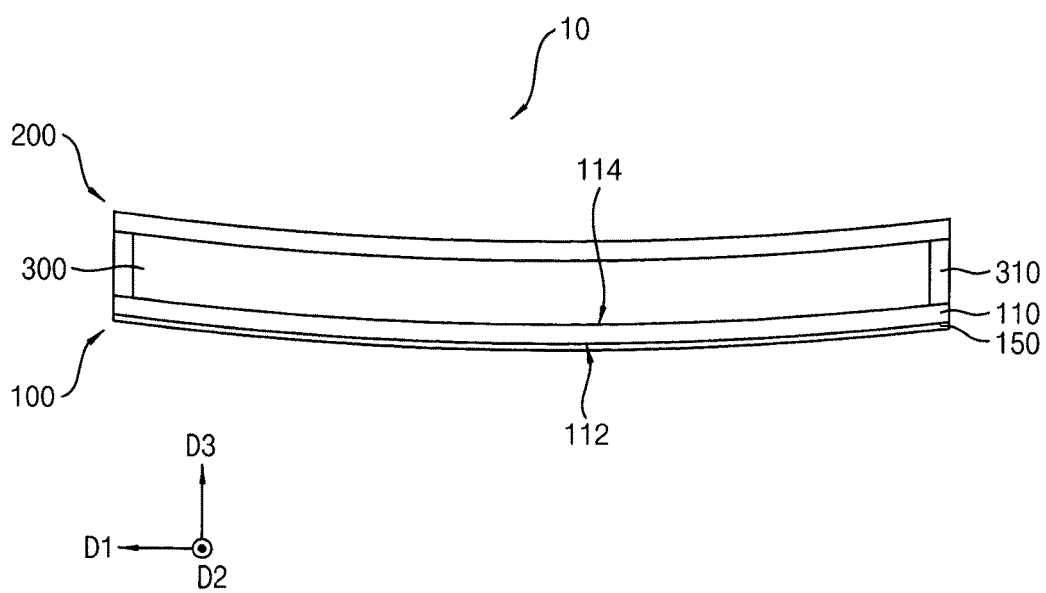

Referring to FIGS. 10 and 11, by using a chemical reinforcement process, the preliminary layer 152 may be transformed into a compression applying layer 150.

A portion of the first alkali ions included in the preliminary layer 152 may be replaced with second alkali ions of which size is greater than a size of the first alkali ions to transform the preliminary layer 152 into the compression applying layer 150. The first curved substrate 104 may be transformed into a first substrate 100.

In an exemplary embodiment, by using a dry ion exchange process, a solution including potassium nitrate and magnesium oxide may be spread on the surface 152 of the preliminary layer 152. A laser emitted by a laser source may be incident on the surface 152 of the preliminary layer 152 to replace the portion of the first alkali ions with the second alkali ions.

In an alternative exemplary embodiment, by using a wet ion exchange process, the preliminary layer 152 may be soaked in a potassium nitrate bath, and then the preliminary layer 152 may be heated to replace the portion of the first alkali ions with the second alkali ions.

The compression applying layer 150 may be disposed on the surface 112 of the alkali-free base layer 110 to apply a compression to the alkali-free base layer 110 such that the compression prevents a plurality of micro flaws MF in FIG. 4 from developing.

In an exemplary embodiment, the compression applying layer 150 may include aluminosilicate, for example. In an exemplary embodiment, a ratio of alkali metal oxide $R_2O$ to aluminum oxide $Al_2O_3$ of the compression applying layer may be within a range of about 0.5 to about 1.5, for example.

In an exemplary embodiment, when the ratio is less than about 0.5, for example, acid resistance may decrease and the compression applying layer 150 may become blurred. When the ratio is greater than about 1.5, glass crystallization may occur such that transmittance of the compression applying layer 150 decreases.

Accordingly, because the curved display panel 10 in accordance with exemplary embodiments includes the alkali-free base layer 110, it is prevented that alkali ions are diffused into a substrate and the curved display panel 10 is deteriorated.

In addition, by a bending process to have a curved shape, the tension A is applied to the alkali-free base layer 110, and a plurality of micro flaws MF included in the alkali-free base layer 110 may develop. However, by the curved display panel 10 in accordance with exemplary embodiments, the compression applying layer 150 applies the compression C to the alkali-free base layer 110 and the compression applying layer 150 may prevent the micro flaws MF from developing.

The compression applying layer 150 includes the non-bridging oxygen and the alkali ion combined with nonbridging oxygen by an ionic bond such that a conventional glass reinforcement process can be performed, and the tension C is applied to the alkali-free base layer 110 adjacent to the compression applying layer 150, and the curved display panel 10 may have a high durability.

FIGS. 12 to 16 are cross-sectional views illustrating steps of a method of manufacturing a curved display panel according to exemplary embodiments. Except for stacking a frit layer, the method of manufacturing the curved display panel may be substantially the same as that of FIGS. 7 to 11. Thus, detailed descriptions on processes and materials substantially the same as or similar to those illustrated with reference to FIGS. 7 to 11 are omitted herein.

Figure 12:
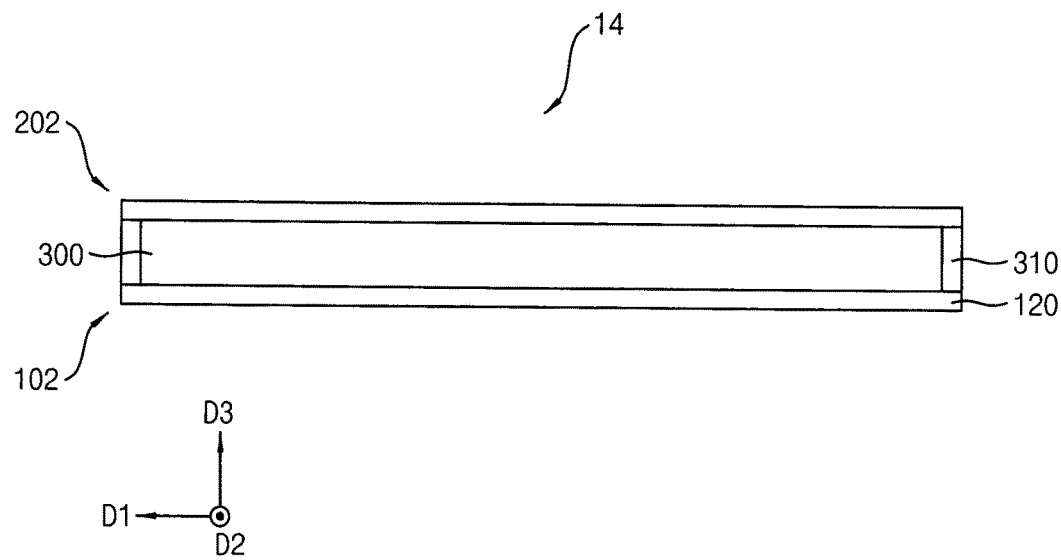
FIGS. 12 to 16 are cross-sectional views illustrating steps of exemplary embodiments of a method of manufacturing a curved display panel according to the invention.

Referring to FIG. 12, a flat display panel 14 may be provided. The flat display 14 may include a first flat substrate 102, a second flat substrate 202 opposite to the first flat substrate 102 and a liquid crystal layer 300 disposed between the first and second flat substrates 102 and 202. The first flat substrate 102 may include an alkali-free flat substrate 120, a switching element on the alkali-free flat substrate 120 and a pixel electrode connected to the switching element.

The first flat substrate 102 may include a plurality of gate lines GL, a plurality of data lines DL, a plurality of switching elements TR and a plurality of pixels PE (refer to FIG. 2).

The second flat substrate 202 may be opposite to the first flat substrate 102, and the second flat substrate 202 may be arranged along a third direction D3 crossing first and second directions D1 and D2.

The liquid crystal layer 300 may be disposed between the first and second flat substrates 102 and 202. Arrangement of molecules included in the liquid crystal layer 300 may be changed by the vertical or horizontal electric field such that a light generated by a back light unit (not shown) may be transmitted or not be transmitted through the liquid crystal layer 300.

A sealing member 310 may connect the first flat substrate 102 and the second flat substrate 202. The liquid crystal layer 300 may be sealed by the first and second flat substrates 102 and 202 and the sealing member 310.

Figure 13:
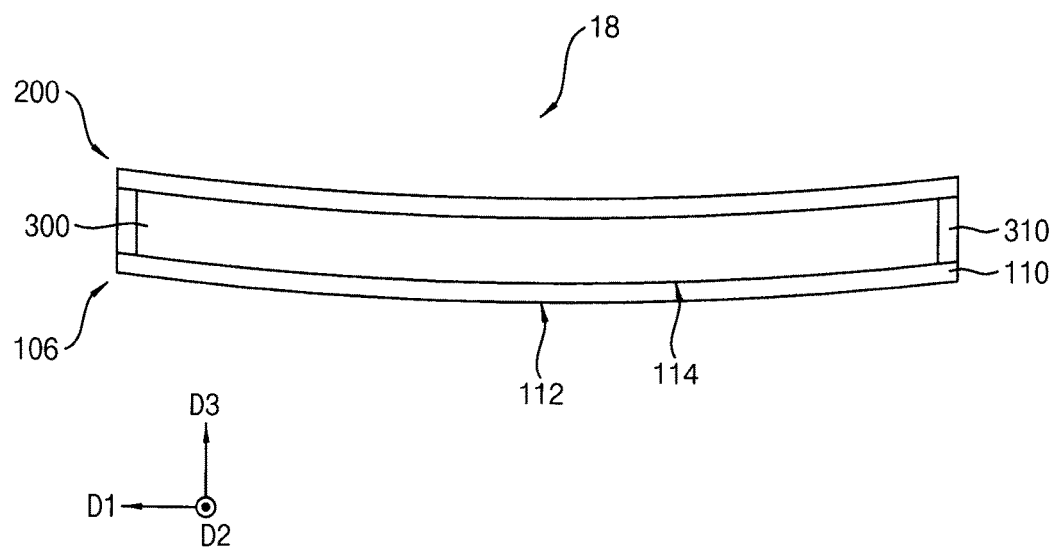

Referring to FIG. 13, a curved preliminary display panel 18 having a curved shape may be provided by bending the flat display panel 14.

By a bending process of the flat display panel 14, the alkali-free flat substrate 120 may be transformed into an alkali-free base layer 110. In addition, the first and second flat substrates 102 and 202 may be transformed into first and second curved substrates 106 and 200, respectively.

Figure 14:
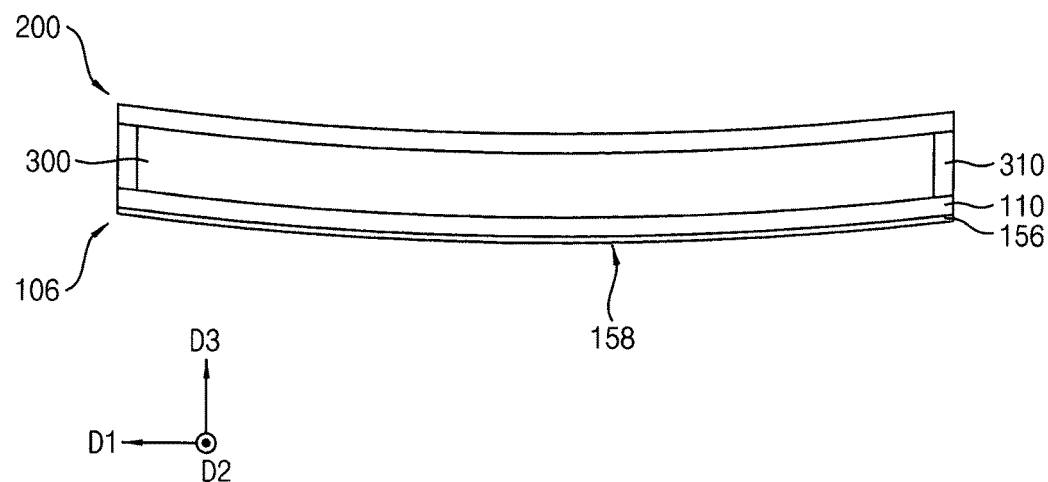

Referring to FIG. 14, a frit layer 156 including a plurality of first alkali ions may be stacked on a surface 112 of the alkali-free base layer 110, and the frit layer 156 may be heated.

In an exemplary embodiment, the frit layer 156 may include the first alkali metal ions, for example. In an exemplary embodiment, the first alkali metal ions may be Li ions, Na ions, K ions, Rb ions, or Cs ions, for example.

By using a laser source, a laser may be incident on the frit layer 156 to heat the frit layer 156.

Figure 15:
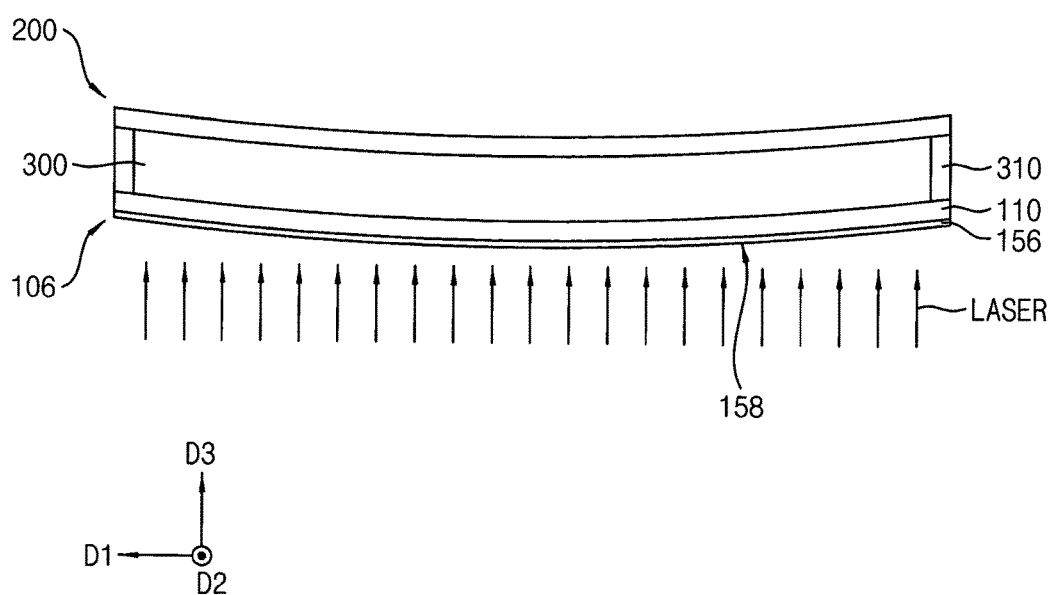
Figure 16:
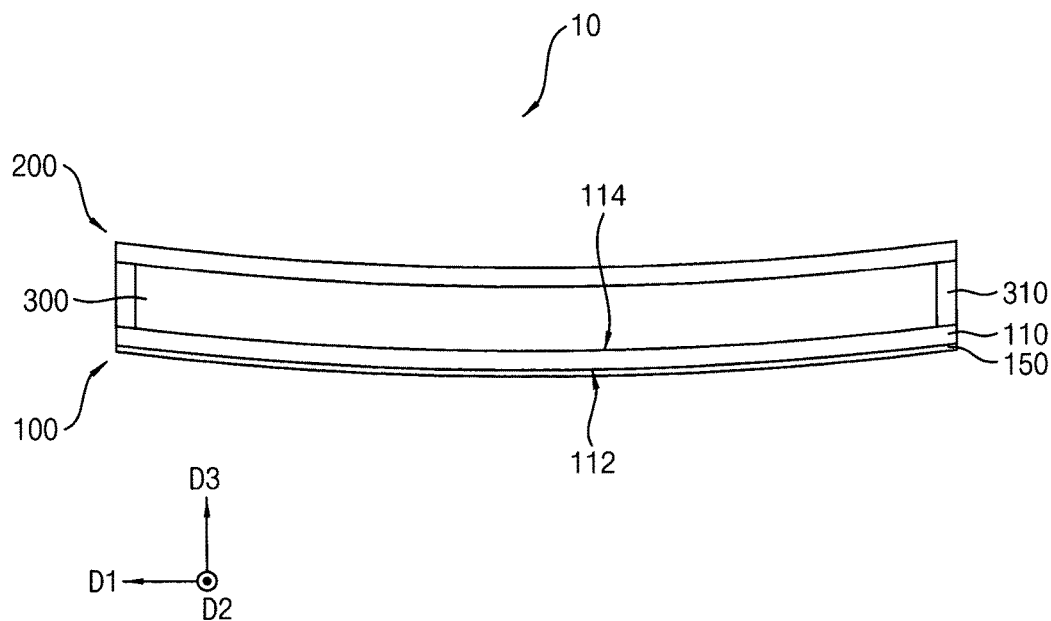

Referring to FIGS. 15 and 16, by using a chemical reinforcement process, the frit layer 156 may be transformed into a compression applying layer 150.

A portion of the first alkali ions included in the frit layer 156 may be replaced with second alkali ions of which size is greater than a size of the first alkali ions to transform the frit layer 156 into the compression applying layer 150. The first curved substrate 106 may be transformed into a first substrate 100.

In an exemplary embodiment, by using a dry ion exchange process, a solution including potassium nitrate and magnesium oxide may be spread on the surface 158 of the frit layer 156, for example. A laser emitted by a laser source may be incident on the surface 158 of the frit layer 156 to replace the portion of the first alkali ions with the second alkali ions.

In an alternative exemplary embodiment, by using a wet ion exchange process, the frit layer 156 may be soaked in a potassium nitrate bath, and then the frit layer 156 may be heated to replace the portion of the first alkali ions with the second alkali ions.

The compression applying layer 150 may be disposed on the surface 112 of the alkali-free base layer 110 to apply a compression to the alkali-free base layer 110 such that the compression prevents a plurality of micro flaws MF in FIG. 4 from developing.

In addition, a coefficient of thermal expansion of the compression applying layer 150 may be substantially the same as a coefficient of thermal expansion of the alkali-free base layer 110. When the alkali-free base layer 110 and the compression applying layer 150 are heated, generated thermal stress of the alkali-free base layer 110 may be reduced.

In an exemplary embodiment, the coefficient of thermal expansion of the compression applying layer 150 may be within a rage of about $30 \times 10^{-7} \, °C.^{-1}$ to about $40 \times 10^{-7} \, °C.^{-1}$, for example.

Accordingly, because the curved display panel 10 in accordance with exemplary embodiments includes the alkali-free base layer 110, it is prevented that alkali ions are diffused into a substrate and the curved display panel 10 is deteriorated.

In addition, by a bending process to have a curved shape, the tension A is applied to the alkali-free base layer 110, and a plurality of micro flaws MF included in the alkali-free base layer 110 may develop. However, by the curved display panel 10 in accordance with exemplary embodiments, the compression applying layer 150 applies the compression C to the alkali-free base layer 110 and the compression applying layer 150 may prevent the micro flaws MF from developing.

The compression applying layer 150 includes the nonbridging oxygen and the alkali ion combined with nonbridging oxygen by an ionic bond such that a conventional glass reinforcement process can be performed, and the tension C is applied to the alkali-free base layer 110 adjacent to the compression applying layer 150, and the curved display panel 10 may have a high durability.

Figure 17:
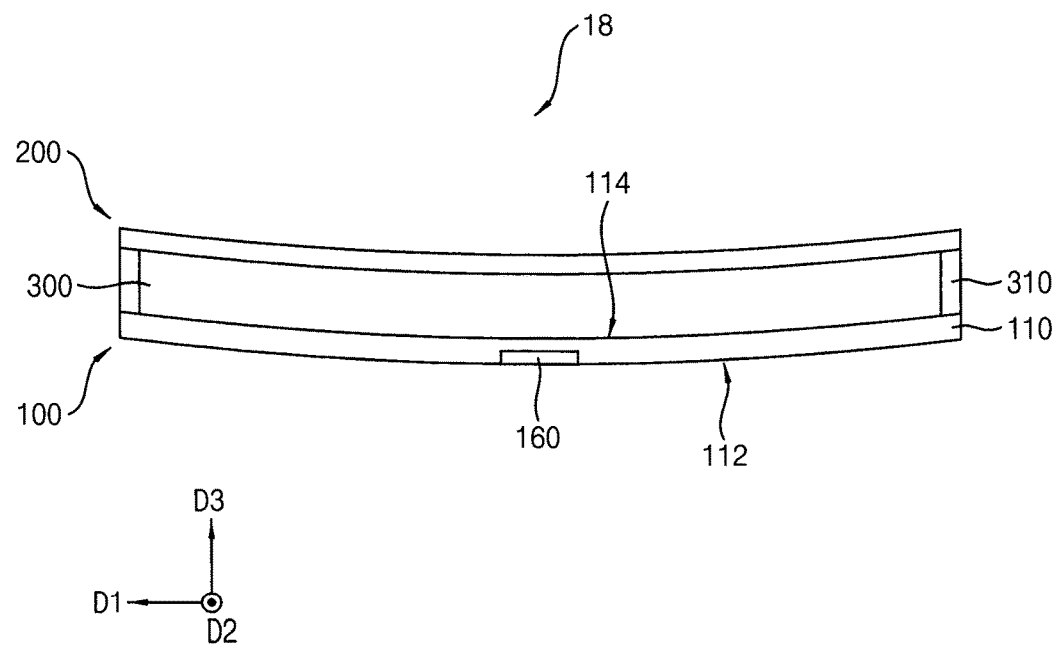
FIG. 17 is a cross-sectional view illustrating exemplary embodiments of a curved display panel according to the invention.
Figure 18:
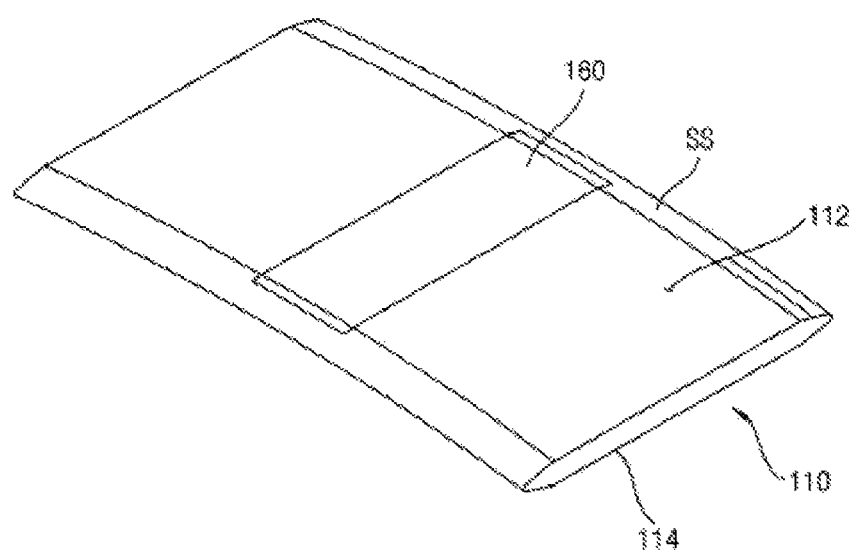
FIG. 18 is a perspective view illustrating the curved display panel of FIG. 17.

FIG. 17 is a cross-sectional view illustrating a curved display panel according to exemplary embodiments. FIG. 18 is a perspective view illustrating the curved display panel of FIG. 17. The curved display panel may be substantially the same as that of FIGS. 1 to 3, except for a compression applying layer which is recessed. Thus, like reference numerals refer to like elements, and repetitive explanations thereof may be omitted herein.

Referring to FIGS. 17 and 18, a curved display panel 18 may include a first substrate 100, a second substrate 200 opposite to the first substrate 100 and a liquid crystal layer 300 disposed between the first substrate 100 and the second substrate 200. Referring to FIG. 18, a compression applying layer 160 may be further disposed in a side surfaces of an alkali-free base layer 110.

Referring back to FIGS. 1 and 2, the first substrate 100 may include a plurality of gate lines GL, a plurality of data lines DL, a plurality of switching elements TR and a plurality of pixels PE. The gate lines GL may extend in a first direction D1 and the gate lines GL may be arranged along a second direction D2 crossing the first direction D1. The data lines DL may extend in the second direction D2 and the data lines DL may be arranged along the first direction D1.

The second substrate 200 may be opposite to the first substrate 100, and the second substrate 200 may be arranged along a third direction D3 crossing the first and second directions D1 and D2.

The liquid crystal layer 300 may be disposed between the first and second substrates 100 and 200. Arrangement of molecules included in the liquid crystal layer 300 may be changed by the vertical or horizontal electric field such that a light generated by a back light unit (not shown) may be transmitted or not be transmitted through the liquid crystal layer 300.

A sealing member 310 may connect the first substrate 100 and the second substrate 200. The liquid crystal layer 300 may be sealed by the first and second substrate 100 and 200 and the sealing member 310.

The first substrate 100 may include an alkali-free base layer 110 having a curved shape and a compression applying layer 160 disposed on a surface 112 of the alkali-free base layer 110.

In an exemplary embodiment, the alkali-free base layer 110 may be an alkali-free glass substrate. In an exemplary embodiment, the alkali-free base layer 110 may not include alkali metal oxide $R_2O$ or may include very little amount of alkali metal oxide $R_2O$, for example.

The compression applying layer 160 may be stacked on the surface 112 of the alkali-free base layer 110. The gate electrode GE, the gate line GL, an active pattern AP, the source electrode SE, the drain electrode DE, the data line DL and the pixel electrode PE may be disposed on the other surface 114 of the alkali-free base layer 110.

In an exemplary embodiment, the compression applying layer 160 may be recessed from the surface 112 of the alkali-free base layer 110, for example.

In example embodiments, the compression applying layer 160 may include nonbridging oxygen. In a glass oxide structure, the nonbridging oxygen may be combined with a positive ion by a covalent bond and another positive ion by an ionic bond.

In an exemplary embodiment, the nonbridging oxygen may be combined with a silicon ion by a covalent bond and also the nonbridging oxygen may be combined with an alkali ion by an ionic bond.

In addition, the compression applying layer 160 may includes a plurality of nonbridging oxygens, a plurality of first alkali ions and a plurality of second alkali ions which are combined with the nonbridging oxygens by an ionic bond, respectively. A size of each of the first alkali ions may be different from a size of each of the second alkali ions.

In an exemplary embodiment, the compression applying layer 160 may primarily include Li ions, and a portion of the Li ions may be replaced with Na ions, for example. Accordingly, the compression applying layer 160 may include Li ions and Na ions.

In an alternative exemplary embodiment, the compression applying layer 160 may primarily include Na ions, and a portion of the Na ions may be replaced with K ions. Accordingly, the compression applying layer 160 may include Na ions and K ions.

By replacing a portion of the first alkali ions of which the size is smaller than the size of the second alkali ions with the second alkali ions, the compression applying layer 160 may apply the compression to the alkali-free base layer 110.

In an exemplary embodiment, the compression applying layer 160 may include aluminosilicate, for example. In an exemplary embodiment, a ratio of alkali metal oxide $R_2O$ to aluminum oxide $Al_2O_3$ of the compression applying layer may be within a range of about 0.5 to about 1.5, for example.

In an exemplary embodiment, when the ratio is less than about 0.5, for example, acid resistance may decrease and the compression applying layer 160 may become blurred. When the ratio is greater than about 1.5, glass crystallization may occur such that transmittance of the compression applying layer 160 decreases.

In addition, a coefficient of thermal expansion of the compression applying layer 160 may be substantially the same as a coefficient of thermal expansion of the alkali-free base layer 110. When the alkali-free base layer 110 and the compression applying layer 160 are heated, generated thermal stress of the alkali-free base layer 110 may be reduced.

In an exemplary embodiment, the coefficient of thermal expansion of the compression applying layer 160 may be within a rage of about $30 \times 10^{-7} \, °C.^{-1}$ to about $40 \times 10^{-7} \, °C.^{-1}$, for example.

In an exemplary embodiment, a radius of curvature of the surface 112 of the alkali-free base layer 110 is greater than a radius of curvature of the other surface 114 of the alkali-free base layer 110, for example. The compression applying layer 160 may be disposed on the surface 112 of the alkali-free base layer 110.

The compression applying layer 160 may be disposed on a portion of the surface 112 of the alkali-free base layer 110 and the compression applying layer 160 may be elongated along the second direction D2 crossing the first direction D1 over a central portion of the alkali-free base layer 110.

In addition, the compression applying layer 160 may be recessed from the surface 112 of the alkali-free base layer 110.

Accordingly, because the curved display panel 18 in accordance with exemplary embodiments includes the alkali-free base layer 110, it is prevented that alkali ions are diffused into a substrate and the curved display panel 18 is deteriorated.

The compression applying layer 160 may be recessed from the surface 112 of the alkali-free base layer 110, and the compression applying layer 160 may prevent a plurality of micro flaws MF from developing.

In particular, the compression applying layer 160 may be disposed on a portion of the surface 112 of the alkali-free base layer 110 such that manufacturing time can be reduced and productivity can increase. In addition, the compression applying layer 160 may be only disposed on a region on which stress is focused such that manufacturing cost can be reduced.

Hereinafter, a method of manufacturing the curved display panel 18 will be mainly described.

FIGS. 19 to 23 are cross-sectional views illustrating steps of a method of manufacturing a curved display panel according to exemplary embodiments. Except for forming a compressing applying layer which is recessed, the method of manufacturing the curved display panel may be substantially the same as that of FIGS. 7 to 11. Thus, detailed descriptions on processes and materials substantially the same as or similar to those illustrated with reference to FIGS. 7 to 11 are omitted herein.

Figure 19:
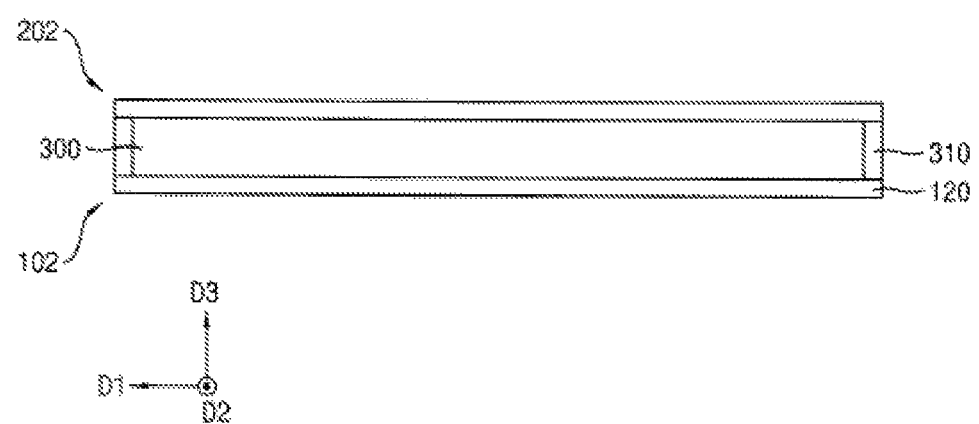
FIGS. 19 to 23 are cross-sectional views illustrating exemplary embodiments of steps of a method of manufacturing a curved display panel according to the invention.

Referring to FIG. 19, a flat display panel 20 may be provided. The flat display panel 20 may include a first flat substrate 102, a second flat substrate 202 opposite to the first flat substrate 102 and a liquid crystal layer 300 disposed between the first and second flat substrates 102 and 202. The first flat substrate 102 may include an alkali-free flat substrate 120, a switching element on the alkali-free flat substrate 120 and a pixel electrode connected to the switching element.

The first flat substrate 102 may include a plurality of gate lines GL, a plurality of data lines DL, a plurality of switching elements TR and a plurality of pixels PE (refer to FIG. 2). The gate lines GL may extend in a first direction D1 and the gate lines GL may be arranged along a second direction D2 crossing the first direction D1. The data lines DL may extend in the second direction D2 and the data lines DL may be arranged along the first direction D1.

The second flat substrate 202 may be opposite to the first flat substrate 102, and the second flat substrate 202 may be arranged along a third direction D3 crossing the first and second directions D1 and D2.

The liquid crystal layer 300 may be disposed between the first and second flat substrates 102 and 202. Arrangement of molecules included in the liquid crystal layer 300 may be changed by the vertical or horizontal electric field such that a light generated by a back light unit (not shown) may be transmitted or not be transmitted through the liquid crystal layer 300.

A sealing member 310 may connect the first flat substrate 102 and the second flat substrate 202. The liquid crystal layer 300 may be sealed by the first and second flat substrates 102 and 202 and the sealing member 310.

Figure 20:
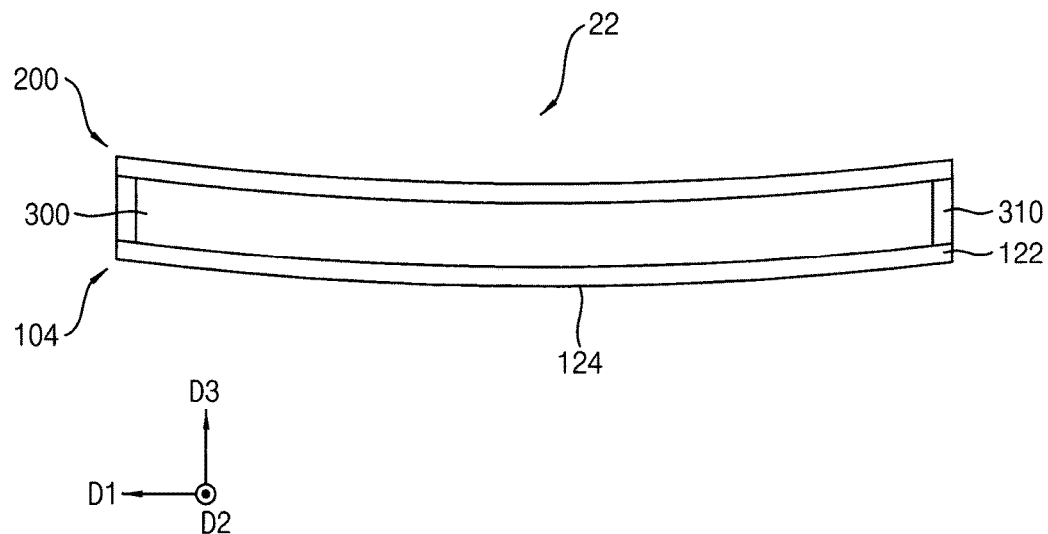

Referring to FIG. 20, a curved preliminary display panel 22 having a curved shape may be provided by bending the flat display panel 20.

In an exemplary embodiment, by applying a force to both ends of the flat display panel 20, the flat display panel 20 may be bent mechanically, for example.

By a bending process of the flat display panel 20, the alkali-free flat substrate 120 may be transformed into a curved alkali-free substrate 122. In addition, the first and second flat substrates 102 and 202 may be transformed into first and second curved substrates 104 and 200, respectively.

Figure 21:
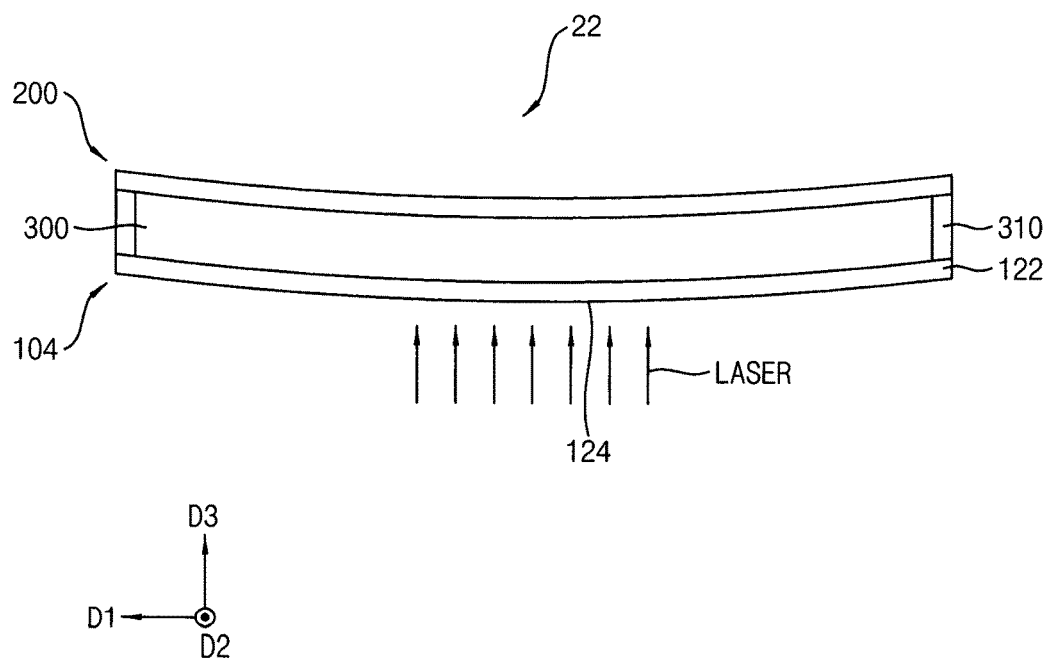

Referring to FIG. 21, a paste including a plurality of first alkali ions may be spread on a surface 124 of the curved alkali-free substrate 122, and the surface 124 of the curved alkali-free substrate 122 spread with the paste may be heated.

In an exemplary embodiment, the paste may include the first alkali metal ions.

The first alkali metal ions may be Li ions, Na ions, K ions, Rb ions, or Cs ions, for example.

In exemplary embodiments, the paste may be spread on a portion of the surface 124 of the curved alkali-free substrate 122. In addition, the paste may be spread along the second direction D2 over a central portion of the curved alkali-free substrate 122.

By using a laser source, a laser may be incident on the surface 124 of the curved alkali-free substrate 122 to heat the surface 124 of the curved alkali-free substrate 122.

When the surface 124 of the curved alkali-free substrate 122 is spread with the paste and heated by the laser source, a bridging oxygen included in the curved alkali-free substrate 122 may be transformed into a nonbridging oxygen.

Figure 22:
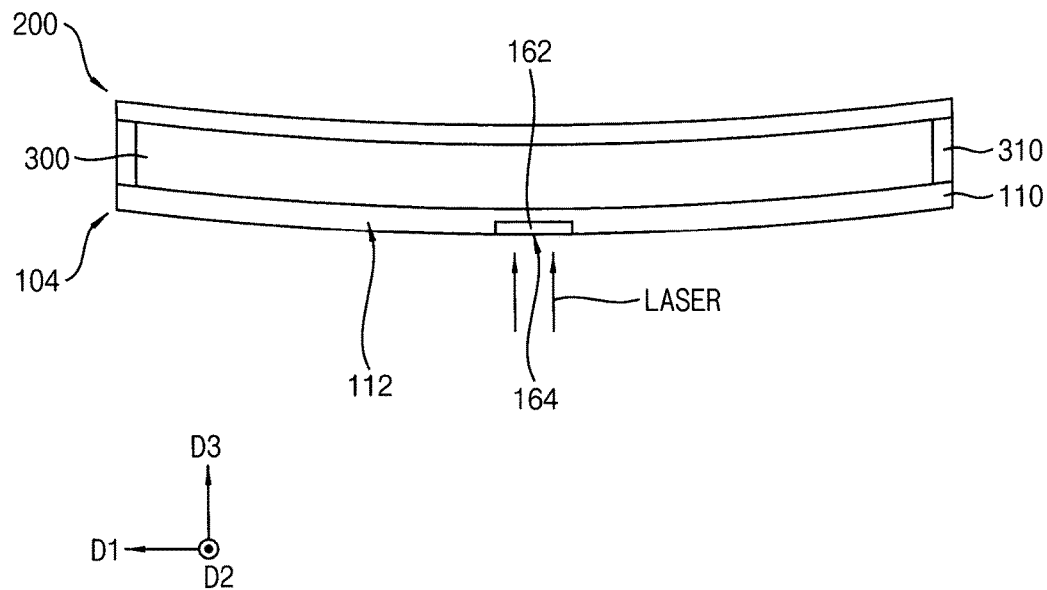

In addition, the curved alkali-free substrate 122 may be transformed into an alkali-free base layer 110 in FIG. 22 and a preliminary layer 162 in FIG. 22 disposed on the alkali-free base layer 110.

In an exemplary embodiment, the preliminary layer 162 may be recessed along the third direction D3, for example.

Figure 23:
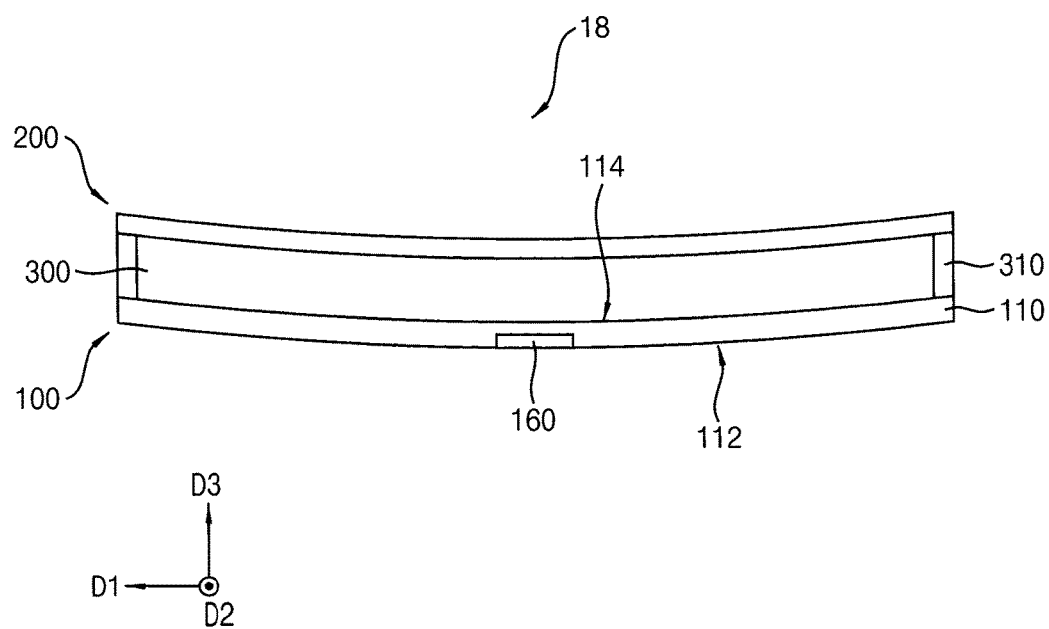

Referring to FIGS. 22 and 23, by using a chemical reinforcement process, the preliminary layer 162 may be transformed into a compression applying layer 160.

A portion of the first alkali ions included in the preliminary layer 162 may be replaced with second alkali ions of which size is greater than a size of the first alkali ions to transform the preliminary layer 162 into the compression applying layer 160. The first curved substrate 104 may be transformed into a first substrate 100.

In an exemplary embodiment, by using a dry ion exchange process, a solution including potassium nitrate and magnesium oxide may be spread on the surface 164 of the preliminary layer 162, for example. A laser emitted by a laser source may be incident on the surface 164 of the preliminary layer 162 to replace the portion of the first alkali ions with the second alkali ions.

In an alternative exemplary embodiment, by using a wet ion exchange process, the preliminary layer 162 may be soaked in a potassium nitrate bath, and then the preliminary layer 162 may be heated to replace the portion of the first alkali ions with the second alkali ions.

The compression applying layer 160 may be disposed on the surface 112 of the alkali-free base layer 110 to apply a compression to the alkali-free base layer 110 such that the compression prevents a plurality of micro flaws MF in FIG. 4 from developing.

In an exemplary embodiment, the compression applying layer 160 may be elongated along the second direction D2 over a central region of the alkali-free base layer 110.

In addition, the compression applying layer 160 may be recessed from the surface 112 of the alkali-free base layer 110.

In an exemplary embodiment, the compression applying layer 160 may include aluminosilicate, for example. In an exemplary embodiment, a ratio of alkali metal oxide $R_2O$ to aluminum oxide $Al_2O_3$ of the compression applying layer may be within a range of about 0.5 to about 1.5, for example.

In an exemplary embodiment, when the ratio is less than about 0.5, for example, acid resistance may decrease and the compression applying layer 160 may become blurred, for example. When the ratio is greater than about 1.5, glass crystallization may occur such that transmittance of the compression applying layer 160 decreases.

Accordingly, because the curved display panel 18 in accordance with exemplary embodiments includes the alkali-free base layer 110, it is prevented that alkali ions are diffused into a substrate and the curved display panel 18 is deteriorated.

The compression applying layer 160 may be recessed from the surface 112 of the alkali-free base layer 110, and the compression applying layer 160 may prevent a plurality of micro flaws MF from developing.

In particular, the compression applying layer 160 may be disposed on a portion of the surface 112 of the alkali-free base layer 110 such that manufacturing time can be reduced and productivity can increase. In addition, the compression applying layer 160 may be only disposed on a region on which stress is focused such that manufacturing cost can be reduced.

Figure 24:
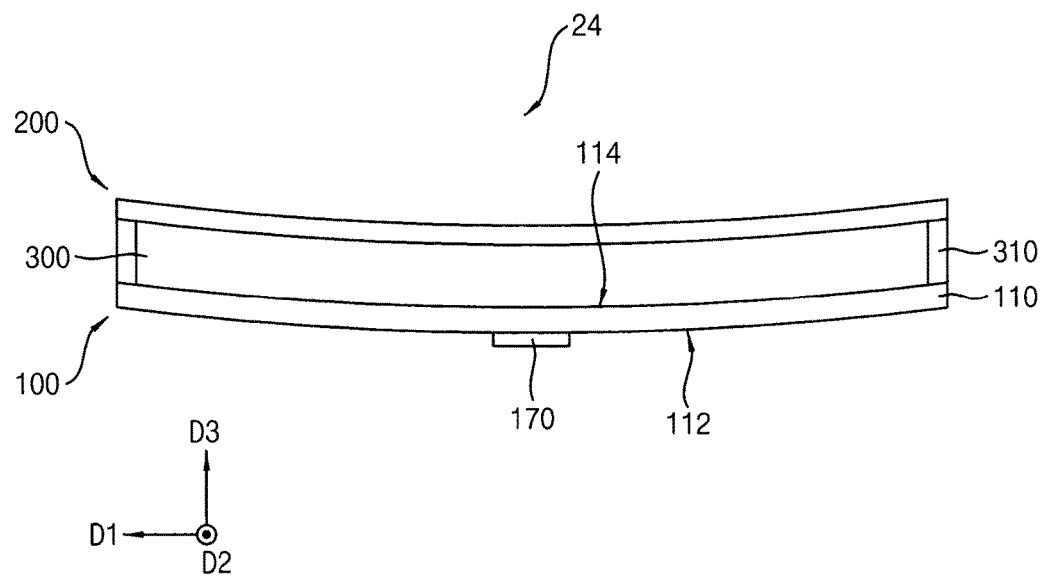
FIG. 24 is a cross-sectional view illustrating exemplary embodiments of a curved display panel according to the invention.
Figure 25:
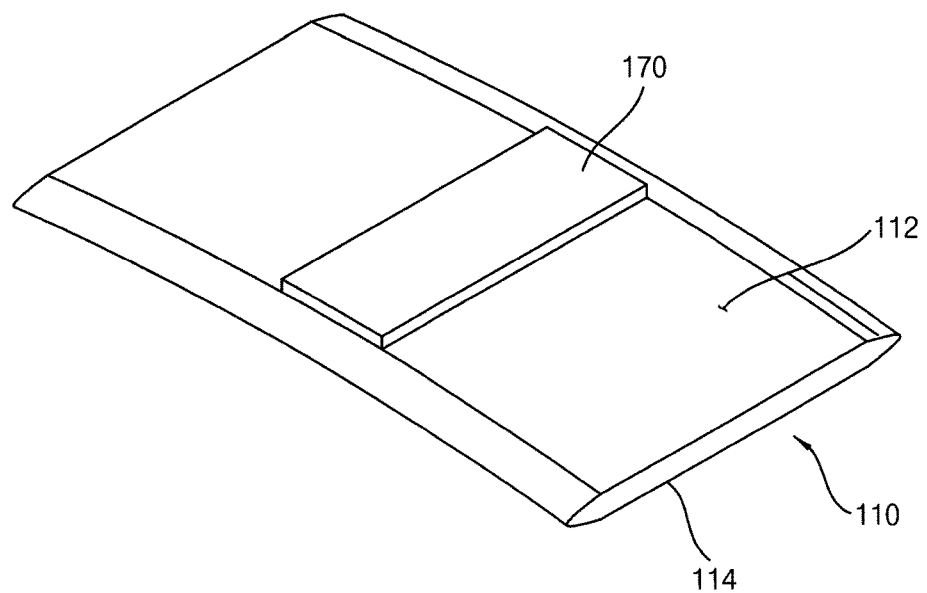
FIG. 25 is a perspective view illustrating the curved display panel of FIG. 24.

FIG. 24 is a cross-sectional view illustrating a curved display panel according to exemplary embodiments. FIG. 25 is a perspective view illustrating the curved display panel of FIG. 24. The curved display panel may be substantially the same as that of FIG. 17, except for a compression applying layer which is protruding. Thus, like reference numerals refer to like elements, and repetitive explanations thereon may be omitted herein.

Referring to FIGS. 24 and 25, a curved display panel 24 may includes a first substrate 100, a second substrate 200 opposite to the first substrate 100 and a liquid crystal layer 300 disposed between the first substrate 100 and the second substrate 200.

Referring back to FIGS. 1 and 2, the first substrate 100 may include a plurality of gate lines GL, a plurality of data lines DL, a plurality of switching elements TR and a plurality of pixels PE. The gate lines GL may extend in a first direction D1 and the gate lines GL may be arranged along a second direction D2 crossing the first direction D1. The data lines DL may extend in the second direction D2 and the data lines DL may be arranged along the first direction D1.

The second substrate 200 may be opposite to the first substrate 100, and the second substrate 200 may be arranged along a third direction D3 crossing the first and second directions D1 and D2.

The liquid crystal layer 300 may be disposed between the first and second substrates 100 and 200. Arrangement of molecules included in the liquid crystal layer 300 may be changed by the vertical or horizontal electric field such that a light generated by a back light unit (not shown) may be transmitted or not be transmitted through the liquid crystal layer 300.

A sealing member 310 may connect the first substrate 100 and the second substrate 200. The liquid crystal layer 300 may be sealed by the first and second substrate 100 and 200 and the sealing member 310.

The first substrate 100 may include an alkali-free base layer 110 having a curved shape and a compression applying layer 170 disposed on a surface 112 of the alkali-free base layer 110.

The alkali-free base layer 110 may be an alkali-free glass substrate. In an exemplary embodiment, the alkali-free base layer 110 may not include alkali metal oxide $R_2O$ or may include very little amount of alkali metal oxide $R_2O$, for example.

The compression applying layer 170 may be stacked on the surface 112 of the alkali-free base layer 110. The gate electrode GE, the gate line GL, an active pattern AP, the source electrode SE, the drain electrode DE, the data line DL and the pixel electrode PE (refer to FIG. 2) may be disposed on the other surface 114 of the alkali-free base layer 110.

In an exemplary embodiment, the compression applying layer 170 may protrude from the surface 112 of the alkali-free base layer 110, for example.

In example embodiments, the compression applying layer 170 may include a nonbridging oxygen. In a glass oxide structure, the nonbridging oxygen may be combined with a positive ion by a covalent bond and another positive ion by an ionic bond.

In an exemplary embodiment, the nonbridging oxygen may be combined with a silicon ion by a covalent bond and also the nonbridging oxygen may be combined with an alkali ion by an ionic bond, for example.

In addition, the compression applying layer 170 may includes a plurality of nonbridging oxygens, a plurality of first alkali ions and a plurality of second alkali ions which are combined with the nonbridging oxygens by an ionic bond, respectively. A size of each of the first alkali ions may be different from a size of each of the second alkali ions.

In an exemplary embodiment, the compression applying layer 170 may primarily include Li ions, and a portion of the Li ions may be replaced with Na ions, for example. Accordingly, the compression applying layer 170 may include Li ions and Na ions.

In an alternative exemplary embodiment, the compression applying layer 170 may primarily include Na ions, and a portion of the Na ions may be replaced with K ions. Accordingly, the compression applying layer 170 may include Na ions and K ions.

By replacing a portion of the first alkali ions of which the size is smaller than the size of the second alkali ions with the second alkali ions, the compression applying layer 170 may apply the compression to the alkali-free base layer 110.

In an exemplary embodiment, the compression applying layer 170 may include aluminosilicate, for example. In an exemplary embodiment, a ratio of alkali metal oxide $R_2O$ to aluminum oxide $Al_2O_3$ of the compression applying layer may be within a range of about 0.5 to about 1.5, for example.

In an exemplary embodiment, when the ratio is less than about 0.5, for example, acid resistance may decrease and the compression applying layer 170 may become blurred. When the ratio is greater than about 1.5, glass crystallization may occur such that transmittance of the compression applying layer 170 decreases.

In addition, a coefficient of thermal expansion of the compression applying layer 170 may be substantially the same as a coefficient of thermal expansion of the alkali-free base layer 110. When the alkali-free base layer 110 and the compression applying layer 170 are heated, generated thermal stress of the alkali-free base layer 110 may be reduced.

In an exemplary embodiment, the coefficient of thermal expansion of the compression applying layer 170 may be within a rage of about $30 \times 10^{-7}$ °C.$^{-1}$ to about $40 \times 10^{-7}$ °C.$^{-1}$, for example.

In an exemplary embodiment, a radius of curvature of the surface 112 of the alkali-free base layer 110 is greater than a radius of curvature of the other surface 114 of the alkali-free base layer 110, for example. The compression applying layer 170 may be disposed on the surface 112 of the alkali-free base layer 110.

The compression applying layer 170 may be disposed on a portion of the surface 112 of the alkali-free base layer 110 and the compression applying layer 170 may be elongated along the second direction D2 crossing the first direction D1 over a central portion of the alkali-free base layer 110.

In addition, the compression applying layer 170 may protrude from the surface 112 of the alkali-free base layer 110.

Accordingly, because the curved display panel 24 in accordance with exemplary embodiments includes the alkali-free base layer 110, it is prevented that alkali ions are diffused into a substrate and the curved display panel 18 is deteriorated.

The compression applying layer 170 may be recessed from the surface 112 of the alkali-free base layer 110, and the compression applying layer 170 may prevent a plurality of micro flaws MF from developing.

In particular, the compression applying layer 170 may be disposed on a portion of the surface 112 of the alkali-free base layer 110 such that manufacturing time can be reduced and productivity can increase. In addition, the compression applying layer 170 may be only disposed on a region on which stress is focused such that manufacturing cost can be reduced.

Hereinafter, a method of manufacturing the curved display panel 24 will be described in detail.

FIGS. 26 to 30 are cross-sectional views illustrating steps of a method of manufacturing a curved display panel according to exemplary embodiments. Except for forming a compressing applying layer which is protruding, the method of manufacturing the curved display panel may be substantially the same as that of FIGS. 19 to 23. Thus, detailed descriptions on processes and materials substantially the same as or similar to those illustrated with reference to FIGS. 19 to 23 are omitted herein.

Figure 26:
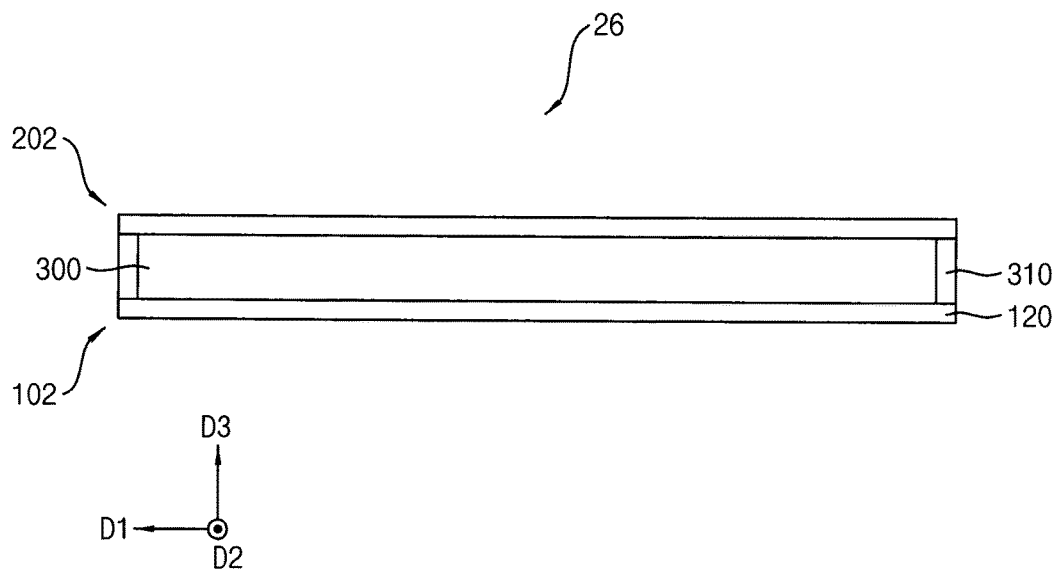
FIGS. 26 to 30 are cross-sectional views illustrating exemplary embodiments of steps of a method of manufacturing a curved display panel according to the invention.

Referring to FIG. 26, a flat display panel 26 may be provided. The flat display panel 26 may include a first flat substrate 102, a second flat substrate 202 opposite to the first flat substrate 102 and a liquid crystal layer 300 disposed between the first and second flat substrates 102 and 202. The first flat substrate 102 may include an alkali-free flat substrate 120, a switching element on the alkali-free flat substrate 120 and a pixel electrode connected to the switching element.

The first flat substrate 102 may include a plurality of gate lines GL, a plurality of data lines DL, a plurality of switching elements TR and a plurality of pixels PE (refer to FIG. 2).

The second flat substrate 202 may be opposite to the first flat substrate 102, and the second flat substrate 202 may be arranged along a third direction D3 crossing the first and second directions D1 and D2.

The liquid crystal layer 300 may be disposed between the first and second flat substrates 102 and 202. Arrangement of molecules included in the liquid crystal layer 300 may be changed by the vertical or horizontal electric field such that a light generated by a back light unit (not shown) may be transmitted or not be transmitted through the liquid crystal layer 300.

A sealing member 310 may connect the first flat substrate 102 and the second flat substrate 202. The liquid crystal layer 300 may be sealed by the first and second flat substrates 102 and 202 and the sealing member 310.

Figure 27:
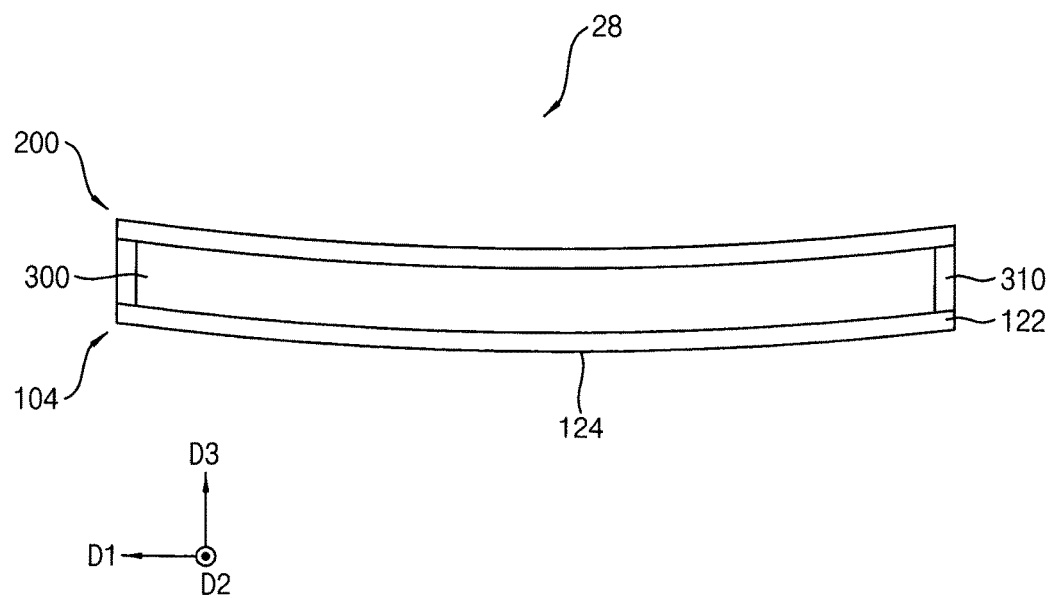

Referring to FIG. 27, a curved preliminary display panel 28 having a curved shape may be provided by bending the flat display panel 26.

By a bending process of the flat display panel 26, the alkali-free flat substrate 120 may be transformed into an alkali-free base layer 122. In addition, the first and second flat substrates 102 and 202 may be transformed into first and second curved substrates 104 and 200, respectively.

Figure 28:
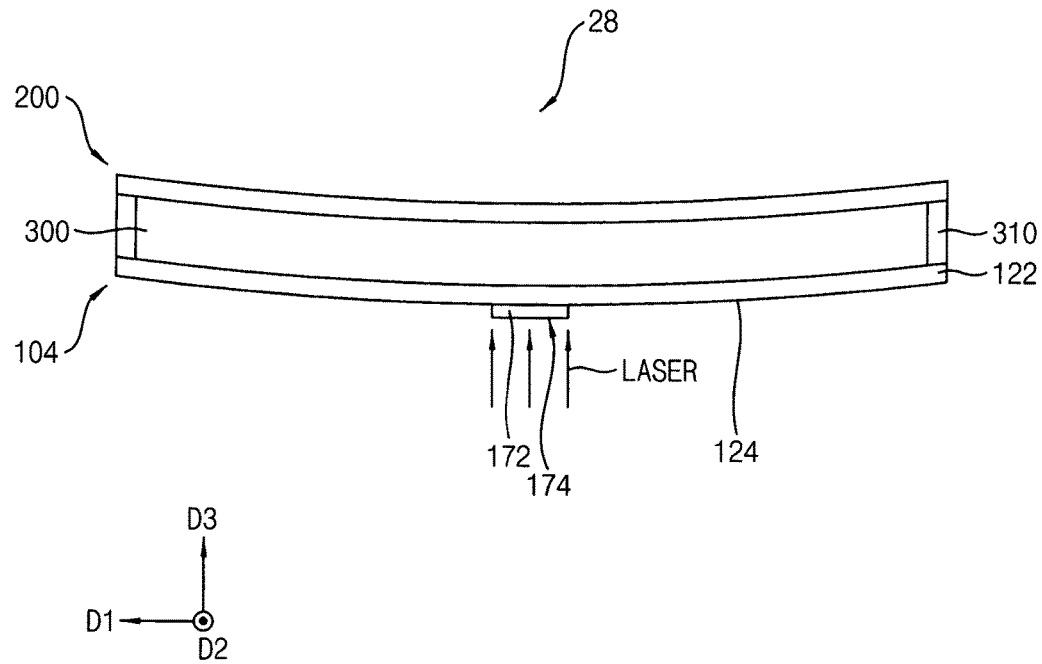

Referring to FIG. 28, a frit layer 172 including a plurality of first alkali ions may be stacked on a surface 112 (refer to FIG. 30) of the alkali-free base layer 110, and the frit layer 172 may be heated.

In an exemplary embodiment, the frit layer 172 may be stacked on a portion of the surface 112 of the alkali-free base layer 110 to be elongated along the second direction D2, for example.

In addition, the frit layer 172 may include the first alkali metal ions. In an exemplary embodiment, the first alkali metal ions may be Li ions, Na ions, K ions, Rb ions, or Cs ions, for example.

By using a laser source, a laser may be incident on the frit layer 172 to heat the frit layer 156.

Figure 29:
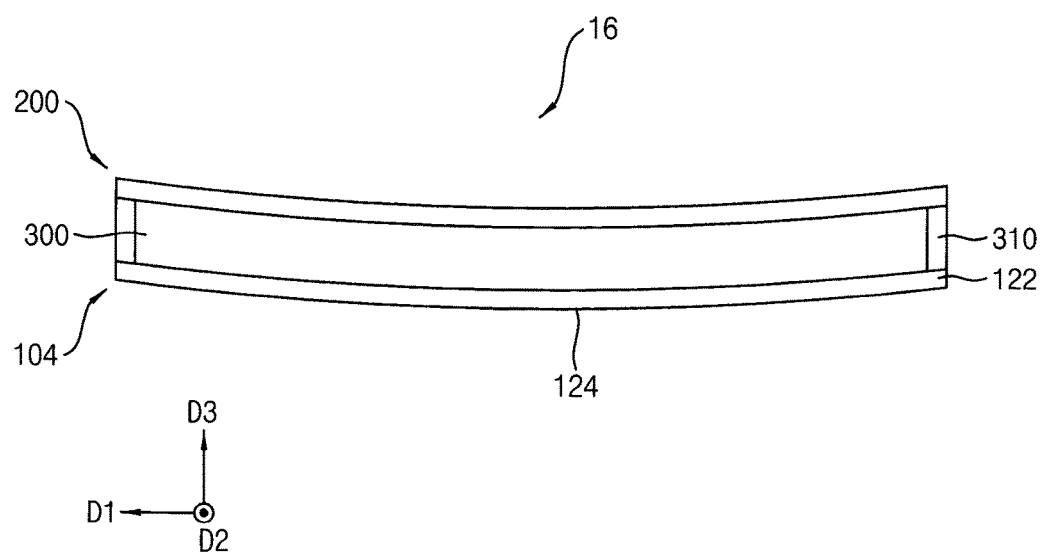
Figure 30:
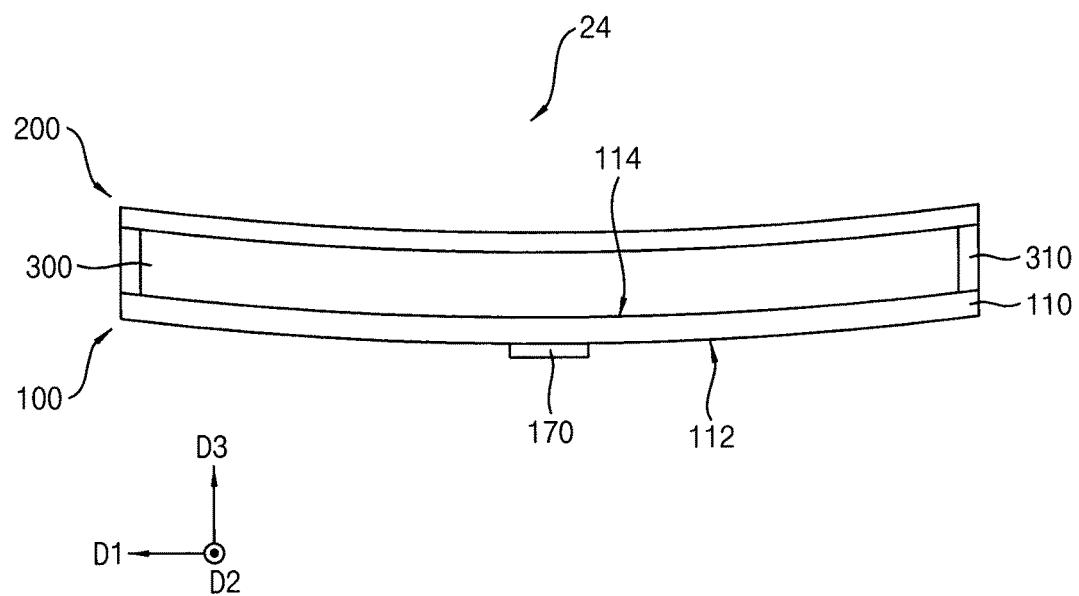

Referring to FIGS. 29 and 30, by using a chemical reinforcement process, the frit layer 172 may be transformed into a compression applying layer 170.

A portion of the first alkali ions included in the frit layer 172 may be replaced with second alkali ions of which size is greater than a size of the first alkali ions to transform the frit layer 172 into the compression applying layer 170. The first curved substrate 104 may be transformed into a first substrate 100.

In an exemplary embodiment, by using a dry ion exchange process, a solution including potassium nitrate and magnesium oxide may be spread on the surface 174 of the frit layer 172, for example. A laser emitted by a laser source may be incident on the surface 174 of the frit layer 172 to replace the portion of the first alkali ions with the second alkali ions.

In an alternative exemplary embodiment, by using a wet ion exchange process, the frit layer 172 may be soaked in a potassium nitrate bath, and then the frit layer 172 may be heated to replace the portion of the first alkali ions with the second alkali ions.

The compression applying layer 170 may be disposed on the portion of the surface 112 of the alkali-free base layer 110 to apply a compression to the alkali-free base layer 110 such that the compression prevents a plurality of micro flaws MF in FIG. 4 from developing.

In addition, a coefficient of thermal expansion of the compression applying layer 170 may be substantially the same as a coefficient of thermal expansion of the alkali-free base layer 110. When the alkali-free base layer 110 and the compression applying layer 170 are heated, generated thermal stress of the alkali-free base layer 110 may be reduced.

In an exemplary embodiment, the coefficient of thermal expansion of the compression applying layer 170 may be within a rage of about $30 \times 10^{-7}$ °C.$^{-1}$ to about $40 \times 10^{-7}$ °C.$^{-1}$, for example.

Accordingly, because the curved display panel 24 in accordance with exemplary embodiments includes the alkali-free base layer 110, it is prevented that alkali ions are diffused into a substrate and the curved display panel 10 is deteriorated.

The compression applying layer 170 may prevent the micro flaws MF from developing.

The compression applying layer 170 includes the nonbridging oxygen and the alkali ion combined with nonbridging oxygen by an ionic bond such that a conventional glass reinforcement process can be performed, and a tension is applied to the alkali-free base layer 110 adjacent to the compression applying layer 170, and the curved display panel 24 may have a high durability.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A curved transparent substrate comprising:
an alkali-free base layer having a curved shape; and
a compression applying layer adjacent to a surface of the alkali-free base layer,
wherein an alkali ion content of the compression applying layer is greater than an alkali ion content of the alkali-free base layer,
wherein the compression applying layer includes aluminosilicate, and a ratio of alkali metal oxide to aluminum oxide of the compression applying layer is within a range of about 0.5 to about 1.5.

2. The curved transparent substrate of claim 1, wherein a nonbridging oxygen content of the compression applying layer is greater than a nonbridging oxygen content of the alkali-free base layer.

3. The curved transparent substrate of claim 1, wherein the compression applying layer includes a plurality of first alkali ions and a plurality of second alkali ions, and
wherein a size of each of the plurality of first alkali ions is different from a size of each of the plurality of second alkali ions.

4. The curved transparent substrate of claim 1, wherein the alkali-free base layer includes a first surface which is convex and a second surface which is concave, and wherein the compression applying layer is adjacent to the first surface of the alkali-free base layer.

5. The curved transparent substrate of claim 4, wherein the compression applying layer is further adjacent to a side surface of the alkali-free base layer.

6. The curved transparent substrate of claim 4, wherein the alkali-free base layer has a curve shape along a first direction, and
wherein the compression applying layer is adjacent to a portion of the first surface of the alkali-free base layer and is elongated along a second direction crossing the first direction over a central portion of the alkali-free base layer.

7. The curved transparent substrate of claim 6, wherein the compression applying layer is recessed from the first surface of the alkali-free base layer.

8. The curved transparent substrate of claim 1, wherein a coefficient of thermal expansion of the compression applying layer is substantially the same as a coefficient of thermal expansion of the alkali-free base layer.

9. A curved display panel comprising:
a first substrate including a curved transparent substrate, a switching element arranged at the curved transparent substrate and a pixel electrode connected to the switching element;
a second substrate opposite to the first substrate; and
a liquid crystal layer disposed between the first and second substrates,
wherein the curved transparent substrate includes an alkali-free base layer having a curved shape and a compression applying layer adjacent to a surface of the alkali-free base layer, and
wherein an alkali ion content of the compression applying layer is greater than an alkali ion content of the alkali-free base layer,
the compression applying layer includes aluminosilicate, and a ratio of alkali metal oxide to aluminum oxide of the compression applying layer is within a range of about 0.5 to about 1.5.

10. The curved display panel of claim 9, wherein a nonbridging oxygen content of the compression applying layer is greater than a nonbridging oxygen content of the alkali-free base layer.

11. The curved display panel of claim 9, wherein the compression applying layer includes a plurality of first alkali ions and a plurality of second alkali ions, and
wherein a size of each of the plurality of first alkali ions is different from a size of each of the plurality of second alkali ions.

12. The curved display panel of claim 9, wherein the alkali-free base layer includes a first surface which is convex and a second surface which is concave, and
wherein the compression applying layer is adjacent to the first surface of the alkali-free base layer.

13. The curved display panel of claim 9, wherein a coefficient of thermal expansion of the compression applying layer is substantially the same as a coefficient of thermal expansion of the alkali-free base layer.

* * * * *